United States Patent [19]

Kamada et al.

[11] Patent Number: 5,087,969

[45] Date of Patent: Feb. 11, 1992

[54] UNMANNED VEHICLE CONTROL SYSTEM WITH GUIDE LINE DETECTION

[75] Inventors: Hiroshi Kamada; Tohru Ozaki, both of Kawasaki, Japan

[73] Assignee: Fujitsu Limited, Kawasaki, Japan

[21] Appl. No.: 554,365

[22] Filed: Jul. 19, 1990

[30] Foreign Application Priority Data

| Jul. 20, 1989 | [JP] | Japan | 1-188037 |
| Jul. 20, 1989 | [JP] | Japan | 1-188039 |
| Jul. 20, 1989 | [JP] | Japan | 1-188040 |
| Aug. 31, 1989 | [JP] | Japan | 1-223180 |

[51] Int. Cl.$^5$ .............................................. H04N 7/18
[52] U.S. Cl. ................................ 358/103; 364/424.01
[58] Field of Search ....................... 358/108, 103, 100; 180/167–169; 364/424.01, 424.02, 424.03; 901/1

[56] References Cited

U.S. PATENT DOCUMENTS

| 4,628,453 | 12/1986 | Kamejima et al. | 358/103 X |
| 4,862,047 | 8/1989 | Suzuki et al. | 364/424.01 X |
| 4,868,252 | 9/1989 | Fujii et al. | 358/103 X |
| 4,933,864 | 6/1990 | Evans, Jr. et al. | 364/424.01 X |

FOREIGN PATENT DOCUMENTS 62-70916 4/1987 Japan .
62-70917 4/1987 Japan .

Primary Examiner—Victor R. Kostak
Attorney, Agent, or Firm—Staas & Halsey

[57] ABSTRACT

A system for controlling an unmanned vehicle by detection of a guide line based on a picture image picked up by a camera on the vehicle, including a parameter $(\rho, \theta)$ deriving unit for deriving parameters $(\rho, \theta)$ of point extracted from a picture image picked up by a camera, and a maximum density parameter detection unit for integrating the densities of parameters derived by the parameter deriving unit and determining the maximum density parameter from the integrated densities of the parameters. The maximum density parameter is determined from the parameter derived by the parameter deriving unit, for the parameter area having at the center thereof the parameter estimated from the maximum density parameter, and the detected maximum density parameter is decided as the parameter of said guide line. The determination of steered amount by a fuzzy inference can be used.

12 Claims, 26 Drawing Sheets

Fig. 2
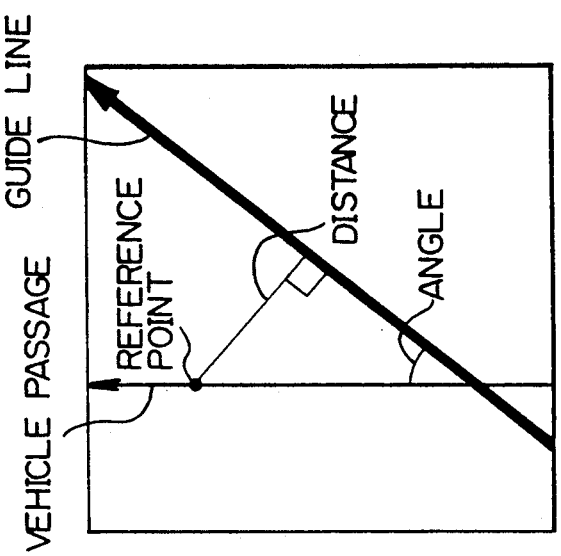
DATA PROCESSED PICTURE IMAGE
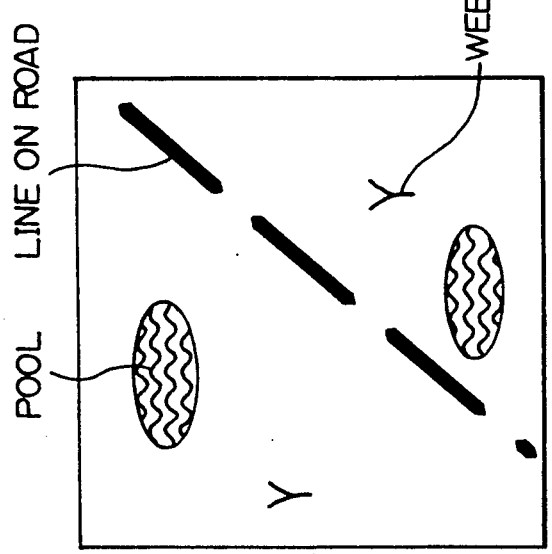
PICKED UP PICTURE IMAGE

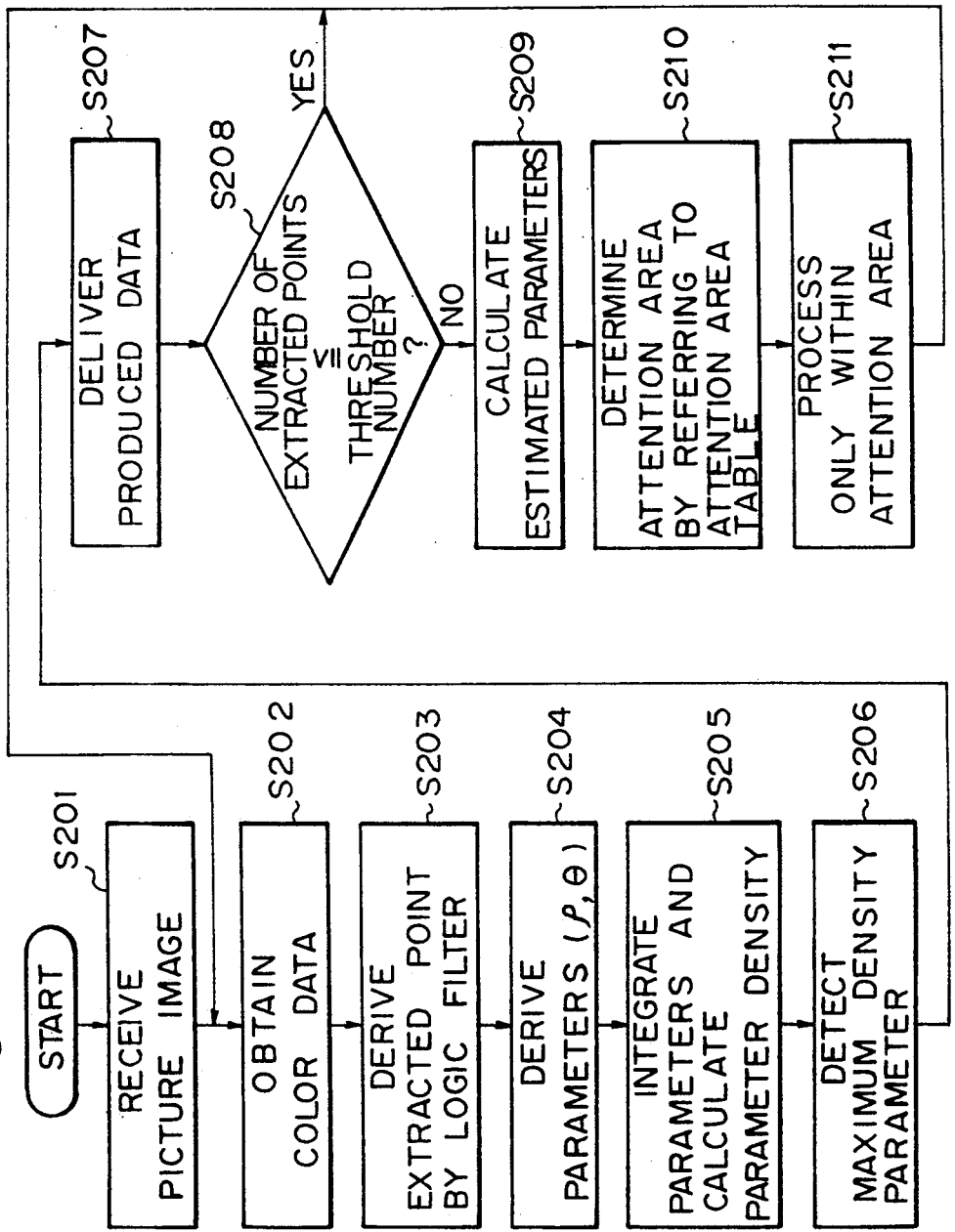

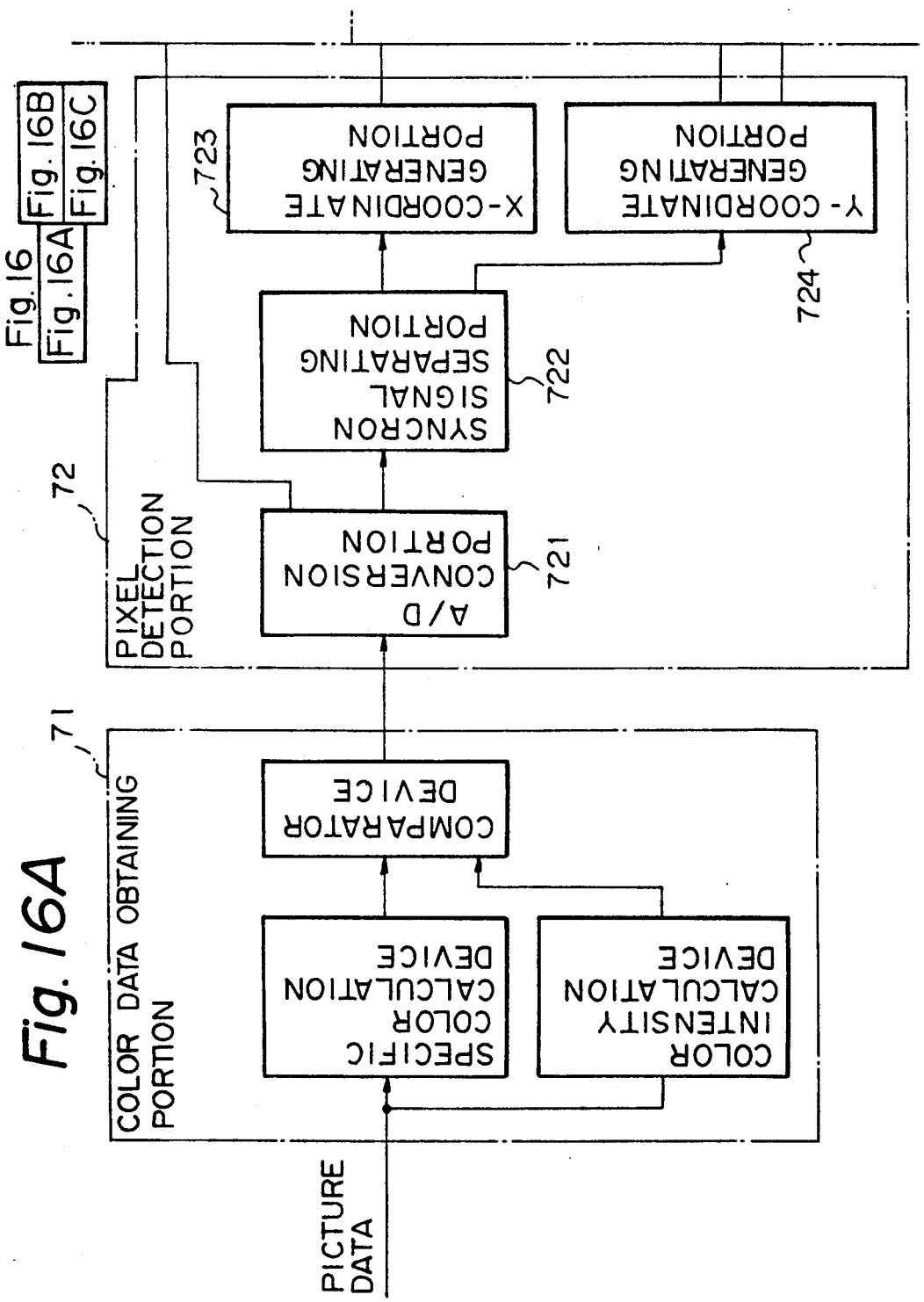

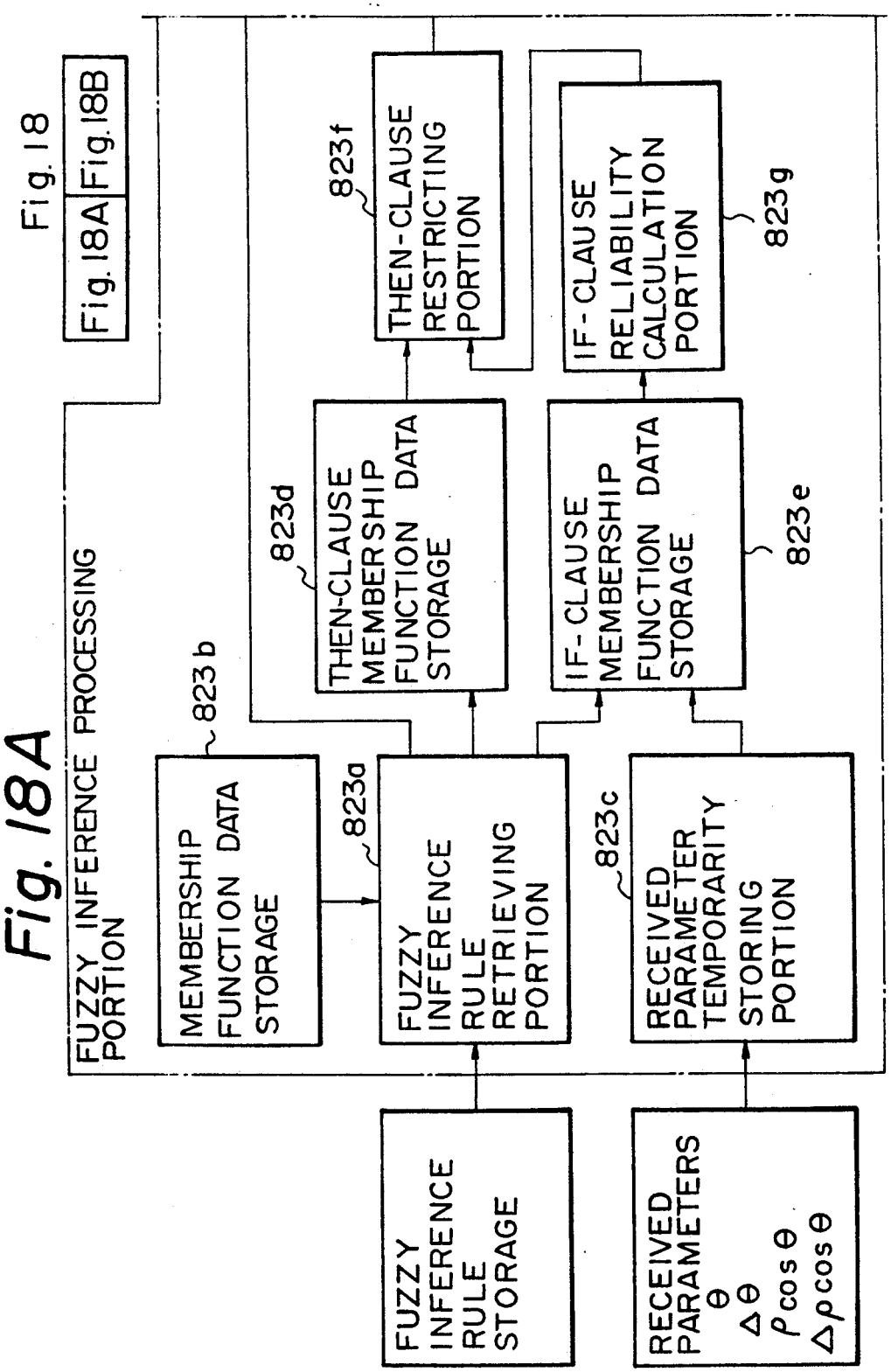

Fig. 21

| CASE NO. | IF-CLAUSE | | THEN-CLAUSE |
|---|---|---|---|
| | $\rho \cos \theta$ | $\theta$ | STEERED AMOUNT |
| 1 | 0 | 0 | 0 |
| 2 | SLIGHTLY RIGHT | 0 | SLIGHTLY RIGHT |
| 3 | SLIGHTLY LEFT | 0 | SLIGHTLY LEFT |
| 4 | SLIGHTLY RIGHT | SLIGHTLY RIGHT | HARD RIGHT |
| 5 | SLIGHTLY LEFT | SLIGHTLY LEFT | HARD LEFT |
| 6 | SLIGHTLY RIGHT | HARD LEFT | HARD LEFT |
| 7 | SLIGHTLY LEFT | HARD RIGHT | HARD RIGHT |
| 8 | HARD RIGHT | 0 | HARD RIGHT |
| 9 | HARD LEFT | 0 | HARD LEFT |

Fig. 22

| CASE NO. | IF-CLAUSE | | THEN-CLAUSE |
|---|---|---|---|
| | $\rho \cos\theta$ | $\Delta\rho \cos\theta$ | STEERED AMOUNT |
| 1 | 0 | 0 | 0 |
| 2 | SLIGHTLY RIGHT | SLIGHTLY LEFT | 0 |
| 3 | SLIGHTLY LEFT | SLIGHTLY RIGHT | 0 |
| 4 | SLIGHTLY RIGHT | SLIGHTLY RIGHT | SLIGHTLY RIGHT |
| 5 | SLIGHTLY LEFT | SLIGHTLY LEFT | SLIGHTLY LEFT |
| 6 | SLIGHTLY RIGHT | HARD LEFT | SLIGHTLY LEFT |
| 7 | SLIGHTLY LEFT | HARD RIGHT | SLIGHTLY RIGHT |
| 8 | HARD RIGHT | 0 | HARD RIGHT |
| 9 | HARD LEFT | 0 | HARD LEFT |

UNMANNED VEHICLE CONTROL SYSTEM WITH GUIDE LINE DETECTION

BACKGROUND OF THE INVENTION

1. Field of the Invention

The present invention relates to a system for controlling an unmanned vehicle by detection of a guide line based on a picture image picked up by a camera on the vehicle. The system according to the present invention can be used for automatically driving an unmanned vehicle along a guide line on the ground by using detection of the guide line by processing picture data and by controlling the vehicle steering by, for example, a fuzzy inference.

2. Description of the Related Arts

In a prior art control of an unmanned vehicle by detection of a guide line based on a picture image picked up by a camera on the vehicle, the so-called parameter space method is used in which data of extracted points are obtained, parameters ($\rho$, $\theta$) are derived from the extracted point data, the maximum density parameter is derived, and accordingly the parameters ($\rho$, $\theta$) of the guide line are determined based on the maximum density parameter.

Of the above parameters, $\rho$ represents the distance of the guide line picture from the reference point in the picture plane, and $\theta$ represents the angle of the guide line picture from the reference line in the picture plane.

The guide line is represented by the following equation (1), where X and Y are the coordinates of an extracted point on the guide line.

$$X\cos\theta + Y\sin\theta = \rho \tag{1}$$

In the determination of the parameter of the guide line, the $\rho$- $\theta$ space is divided by a grid pattern into a plurality of squares, the integration of parameters is carried out for each of the squares, the density of the parameters is calculated for each of the squares, and accordingly the parameter of the guide line is determined.

However, there have been problems in the prior arts such that a great many calculations are needed for the determination of the parameter of guide line, much time is needed for the calculations, no measures are taken to counteract the variations of the vehicle motion, and the data processings are apt to be affected by the existence of noise data caused by the variations of the vehicle motion.

SUMMARY OF THE INVENTION

It is an object of the present invention to provide an improved system for controlling an unmanned vehicle by detection of a guide line based on a picture image picked up by a camera on the vehicle by which the detection of the guide line by a picture data processing can be carried out more precisely and quickly and the control of the vehicle steering can be carried out more reliably.

In accordance with a basic aspect of the present invention, there is provided a system for controlling an unmanned vehicle by detection of a guide line based on a picture image picked up by a camera on the vehicle, the system including a parameter ($\rho$, $\theta$) deriving unit for deriving parameters ($\rho$, $\theta$) of a point extracted from a picture image picked up by a camera; and a maximum density parameter detection unit for integrating the densities of parameters derived by the parameter deriving unit and determining the maximum density parameter from the integrated densities of the parameters. The maximum density parameter is determined from the parameter derived by the parameter deriving unit for the parameter area having at the center thereof the parameter estimated from the maximum density parameter.

The detected maximum density parameter is decided as the parameter of the guide line.

BRIEF DESCRIPTION OF THE DRAWINGS

In the drawings,

FIG. 2 illustrates the correspondence between a picked-up picture image of a forward view and a picture image derived by data processing;

FIG. 10 shows a flow chart of the operation of the system of FIG. 7;

FIGS. 16, 16A - 16C show the structure of the picture data processing unit in the system of FIG. 15;

FIG. 18, 18A and 18B show the structure of the fuzzy inference processing portion in the steered amount determination portion of FIG. 17;

FIGS. 21 and 22 illustrate examples of tables showing the relationship between if-clause and then clause used by the fuzzy inference.

DESCRIPTION OF THE PREFERRED EMBODIMENTS

Figure 1:
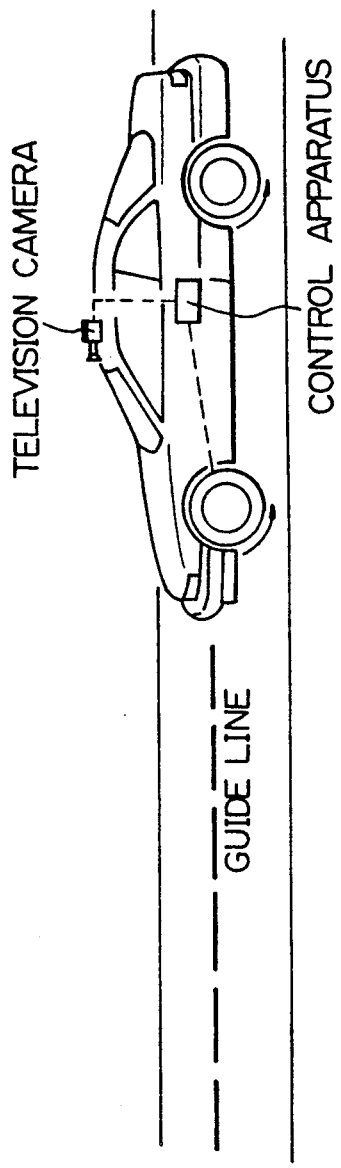
FIG. 1 illustrates an unmanned vehicle on a road having a guide line to which the system according to the present invention is to be applied.

An unmanned vehicle on a road having a guide line to which the system according to the present invention is to be applied is illustrated in FIG. 1. A television camera for picking up a picture image of the forward view with respect to the vehicle and a control apparatus of the system according to the present invention are mounted on the vehicle.

The correspondence between a picked-up picture image of a forward view and a picture image derived by data processing is illustrated in FIG. 2.

In the left part of FIG. 2, a picked up picture image of a forward view including portions of a guide line, pools, weeds and the like is illustrated. In the right part of FIG. 2, a picture image derived by the data processing of the picture image of the left part of FIG. 2 is illustrated. The derived picture image includes a straight vertical line representing the passage of the vehicle, a reference point on the straight vertical line, and a slant straight line representing the guide line.

The distance of the guide line from the reference point is the length along the line perpendicular to the guide line from the reference point to the crossing point of the guide line and the perpendicular line. The angle of the guide line is the angle between the vehicle passage line and the guide line.

Figure 3:
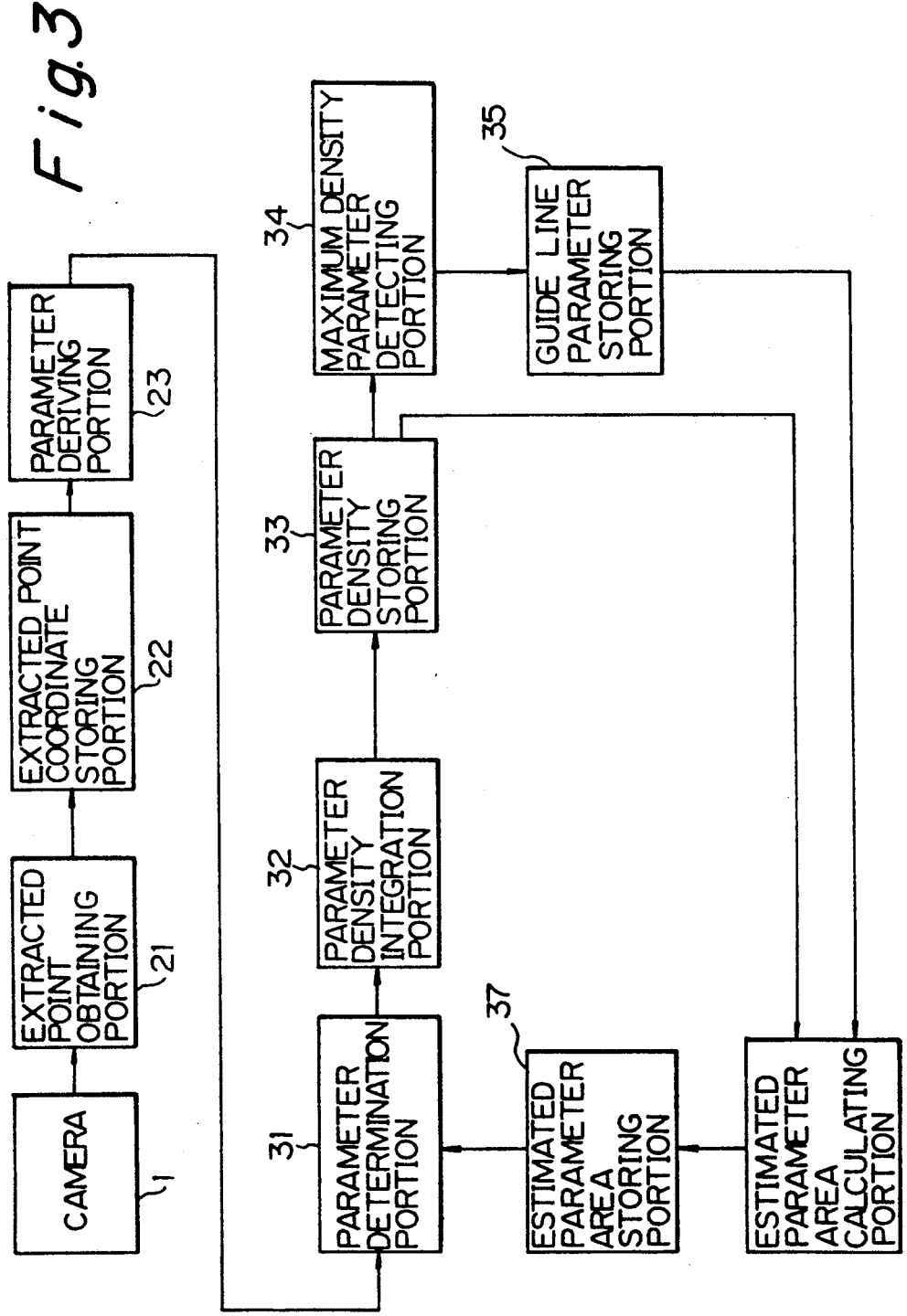
FIG. 3 shows a system for controlling an unmanned vehicle according to an embodiment of the present invention.

A system for controlling an unmanned vehicle according to an embodiment of the present invention is shown in FIG. 3. The system of FIG. 3 includes a television camera 1, an extracted point obtaining portion 21, an extracted point coordinate storing portion 22, a parameter deriving portion 23, a parameter determination portion 31, a parameter density integration portion 32, a parameter density storing portion 33, a maximum density parameter detecting portion 34, a guide line parameter storing portion 35, an estimated parameter area calculating portion 36, and an estimated parameter area storing portion 37.

The camera 1 picks up the picture image of a guide line in the forward view. The guide line may be a line drawn on the ground along which the vehicle is to run. Alternatively, the guide line may be the border between an area of mown lawn and an area of unmown lawn in the case of the vehicle being an unmanned lawn mower. The extracted point obtaining portion 21 derives points of a predetermined nature, such as white color as the color of the guide line, as the extracted points from the picked up picture image. The extracted point coordinate storing portion 22 stores the coordinates of the extracted points. The parameter deriving portion 23 derives the parameters $(p, \theta)$ of the extracted points from the coordinates read from the extracted point coordinate storing portion 22.

The parameter determination portion 31 checks whether the derived parameter derived by the parameter deriving portion 23 is within the estimated parameter area. Stored in the estimated parameter area storing portion 37 or not, and sends an instruction to the parameter density integration portion 32 to carry out an integration of the parameter densities when the derived parameter is within the estimated parameter area, but sends an instruction not to carry out the integration of the parameter densities when the derived parameter is outside the estimated parameter area. Because of this process, the amount of calculation can be reduced.

The parameter density integration portion 32 carries out an integration of the parameter densities concerning the relevant region in the $p$-$\theta$ space based on the parameters derived in the parameter deriving portion 23. The parameter density storing portion 23 stores the parameter densities from the parameter density integration portion 32. The maximum density parameter detection portion 34 determines the parameter of the maximum density with regard to a square divided in the $p$-$\theta$ space among the parameters integrated in the $p$-$\theta$ space. The guide line parameter storing portion 35 stores the maximum density parameter determined in the maximum density parameter detection portion 34.

The estimated parameter area calculation portion 36 calculates an estimated parameter area from the past parameters for the guide line.

Figure 4:
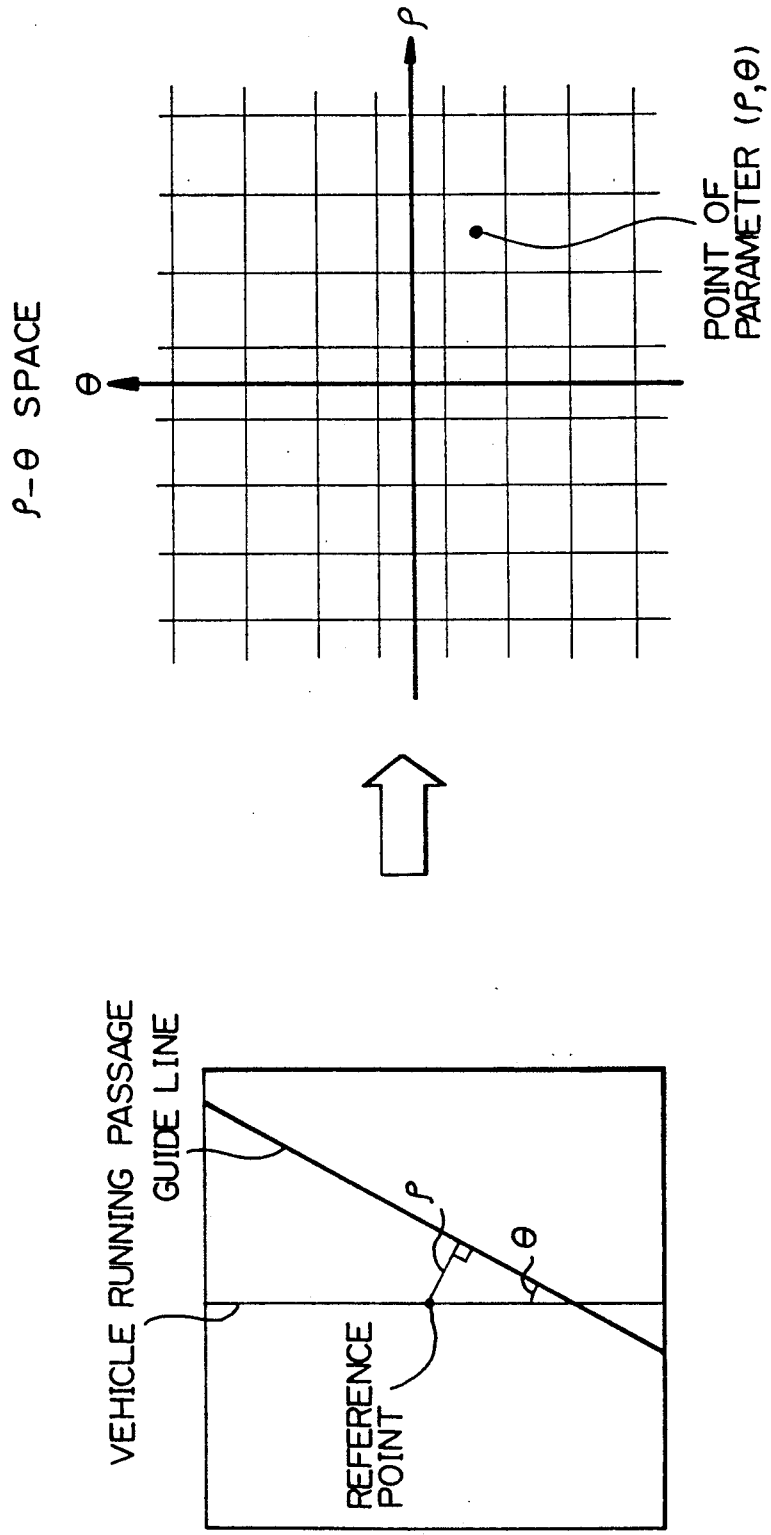
FIG. 4 illustrates the relationship between the definition of parameters of a guide line in the picture image plane and the designation of the parameter in the $\rho$- $\theta$ space.

The relationship between the definition of parameters of a guide line in the picture image plane and the designation of the parameter in the $p$-$\theta$ space is illustrated in FIG. 4. In the left part of FIG. 4, distance $p$ of the guide line from the reference point and angle $\theta$ of the guide line from the vehicle running passage in the picture plane are shown. The guide line is represented by the equation (1) indicated hereinbefore. In the right part of FIG. 4, the $p$-$\theta$ space is divided with a grid pattern into a plurality of squares, and POINT $(p, \theta)$ is designated in the $p$-$\theta$ space in correspondence with the values $(p, \theta)$ for the guide line in the left part of FIG. 4.

Figure 5:
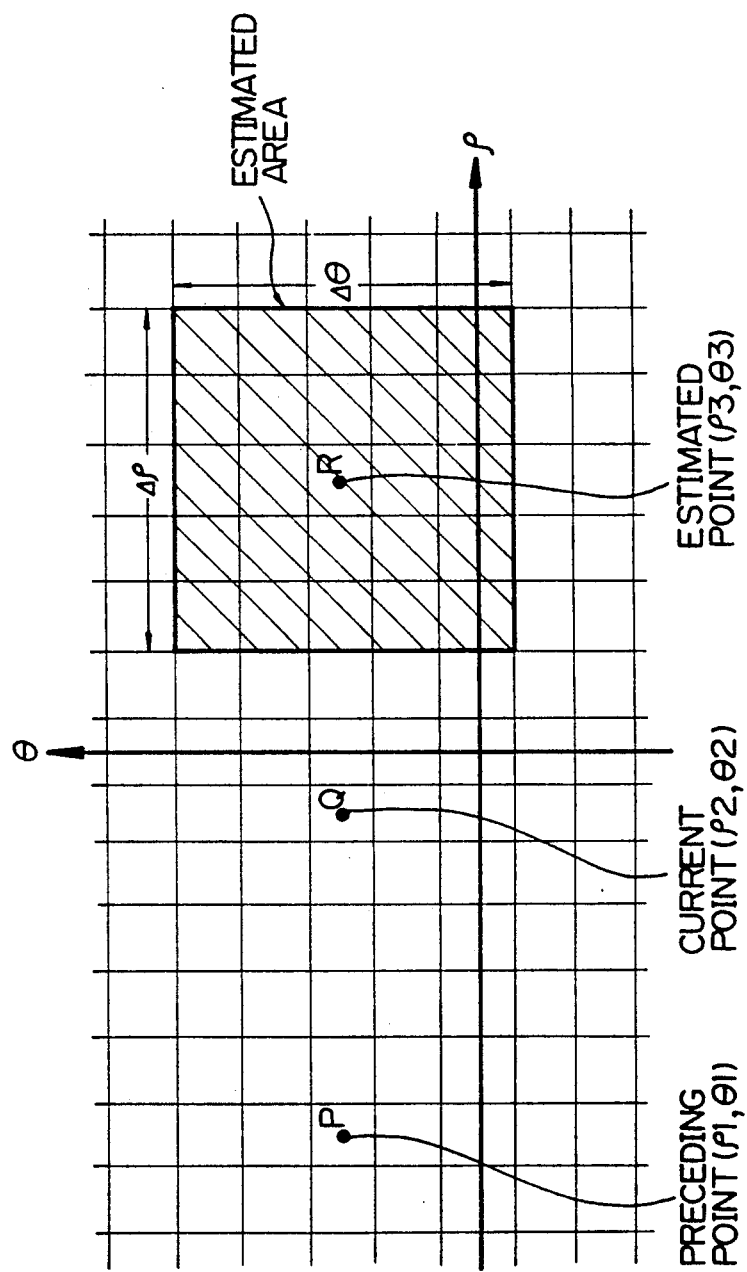
FIG. 5 shows a setting of an estimated area in the $\rho$- $\theta$ space by a process of parameter estimation.

A setting of an estimated area in the $p$-$\theta$ space by a process of parameter estimation is illustrated in FIG. 5. In FIG. 5, P represents the parameters $(p1, \theta1)$ of the past point, Q represents the parameters $(p2, \theta2)$ of the current point, and R represents the parameters $(p3, \theta3)$ of the estimated point. The parameters of the estimated point R are derived in accordance with a linear estimation process. Examples of the linear estimation process are as follows.

In the case of the derivation of the estimated point $R(p3, \theta3)$ from the parameters $(p2, \theta2)$ for the current point Q, an estimation: $p3 = \theta$ and $p3 = \theta2$ is carried out, and a rectangular area in the $p$-$\theta$ space having the longitudinal length an and the lateral length $\Delta p$ and having the estimated point $R(\theta3, p3)$ at the center thereof is determined as the estimated area.

In the case of the derivation of the estimated point $R(p3, \theta3)$ from the parameters $(p2, \theta2)$ for the current point Q and the parameters $(p1, \theta1)$ for the past point P, an estimation: $p3 = p2 + (p2 - p1)$ and $\theta3 = \theta2 + (\theta2 - \theta1)$ is carried out, and a rectangular area having the longitudinal length $\Delta p$ and the lateral length $\Delta \theta$ and having the estimated point $R(p3, p3)$ at the center thereof is determined as the estimated area.

After the determination of the estimation area in either of the above-described cases, if the number of the parameters in the estimated area becomes less than a predetermined threshold value N(TH1), the estimated area is expanded by increasing $\Delta p$ and $\Delta \theta$ with the center thereof at the estimated point $R(p3, \theta3)$, but if the number of the parameters in the estimated area becomes larger than a predetermined threshold value N(TH2), the estimated area is reduced by reducing $\Delta p$ and $\Delta \theta$ with the center thereof at the estimated point $R(p3, \theta3)$.

Figure 6:
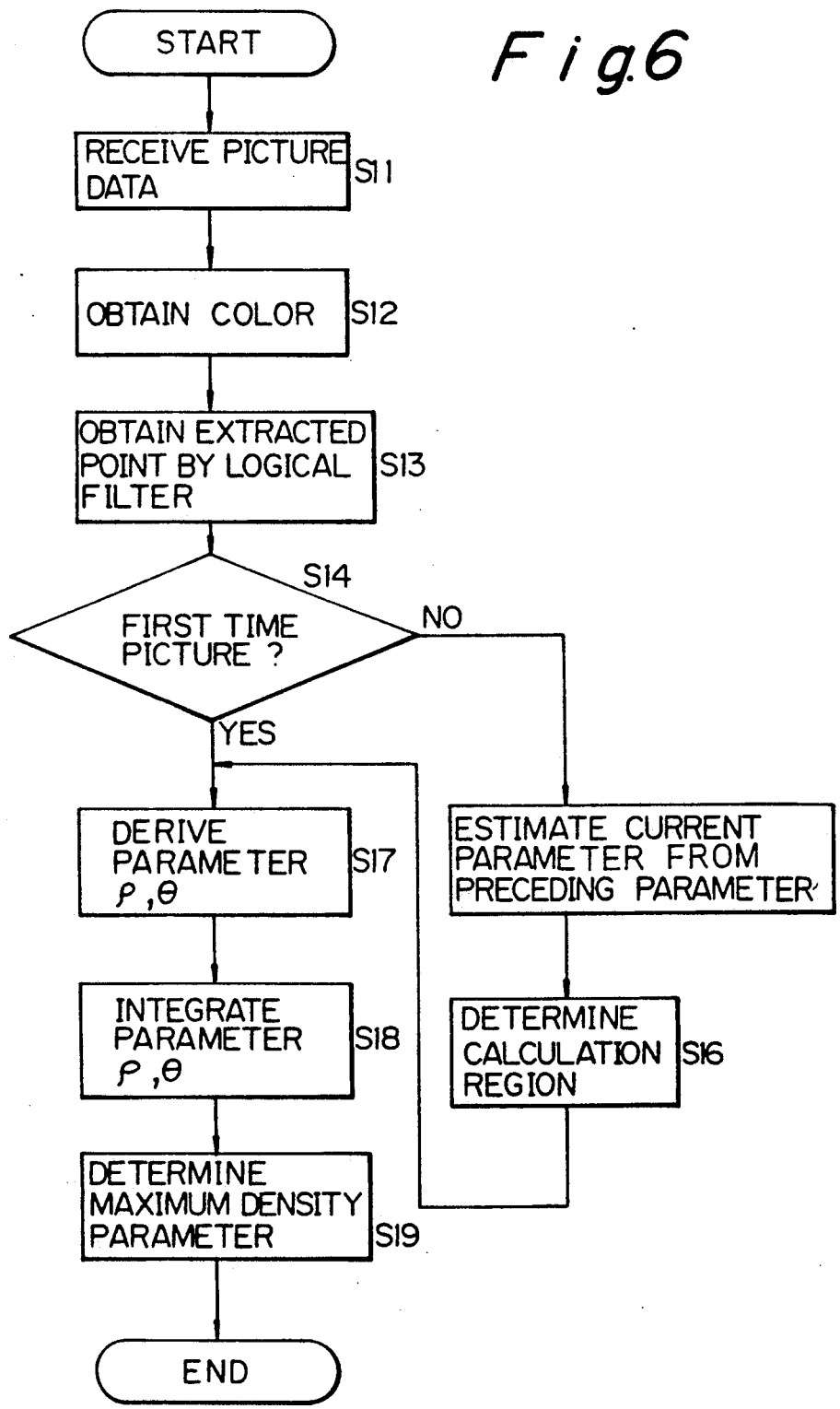
FIG. 6 shows a flow chart of the operation of the system of FIG. 3.

The operation of the system of FIG. 3 will be explained with reference to FIG. 6 showing a flow chart of the operation.

A picture data is received through the camera 1 in step S11. Data of color, e.g., white color, is obtained in step S12. An extracted point is obtained by using a logical filter, e.g., a logical filter of 3 dots by 3 dots, in step S13. A decision of whether or not the current picture is a first time picture is carried out in step S14. The fact that the content of the estimated parameter area storing portion 37 is zero when the current picture is the first time picture has been taken into consideration.

When the decision is NO, an estimation of the current parameter is carried out based on the past parameter in step S15, and a region for which a calculation is to be carried out as shown in FIG. 5 as the estimated area, is determined in step S16.

When the decision is YES in step S14, parameters ($\rho$, $\theta$) are derived in step S17.

With regard to the second time and the subsequent pictures, the derivation of the parameters is carried out in step S17 based on the result of the determination of step S16.

The parameters are integrated in step S18 to calculate the density of parameters in the squares of the $\rho$- $\theta$ space. The maximum density parameter is determined to find out the coordinates for the maximum density parameter in step S19, so that the maximum density parameter is delivered as the parameter of the guide line is delivered, as the result of the determination.

Thus, in the operation of the system of FIG. 3, the parameter deriving process is carried out only in the estimated area estimated from the derived parameters of the guide line. Accordingly, the amount of data processing for deriving the parameters is reduced, the parameter of the guide line is determined at high speed, the introduction of noise data is effectively prevented, and thus the parameter of the guide line is obtained with high precision.

Figure 7:
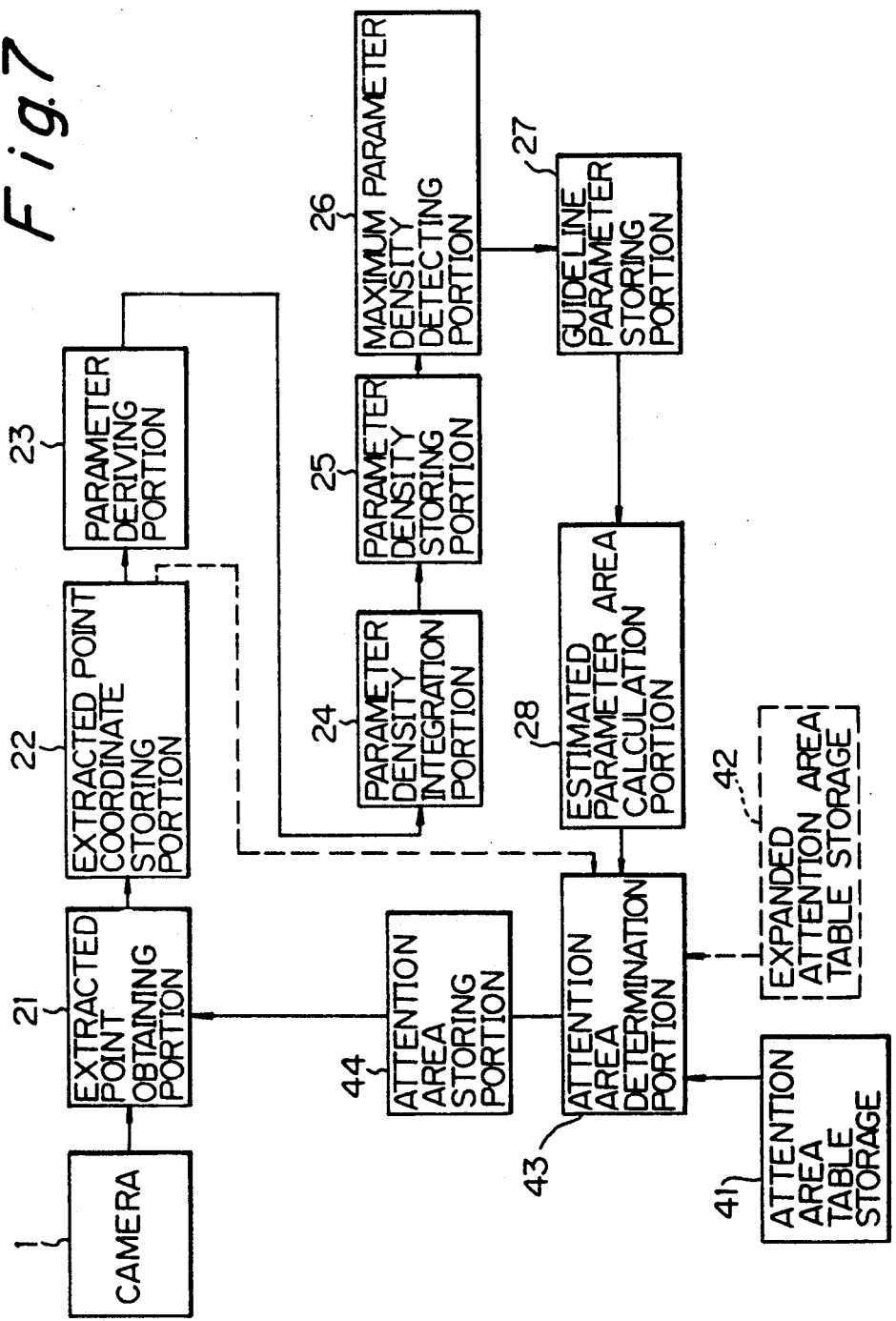
FIG. 7 shows a system for controlling an unmanned vehicle according to another embodiment of the present invention.

A system for controlling an unmanned vehicle according to another embodiment of the present invention is shown in FIG. 7. The system of FIG. 7 includes a camera 1, an extracted point obtaining portion 21, an extracted point coordinate storing portion 22, a parameter deriving portion 23, a parameter density integration portion 24, a parameter density storing portion 25, a maximum parameter density detecting portion 26, a guide line parameter storing portion 27, an estimated parameter area calculation portion 28, an attention area table storage 41, an attention area determination portion 43, and an attention area storing portion 44. In an alternate embodiment of the system, an expanded attention area table storage 42 may be included.

The operations of the camera 1 through the estimated parameter area calculation portion 28 are similar to those of the corresponding portions in the case of FIG. 3.

Figure 8:
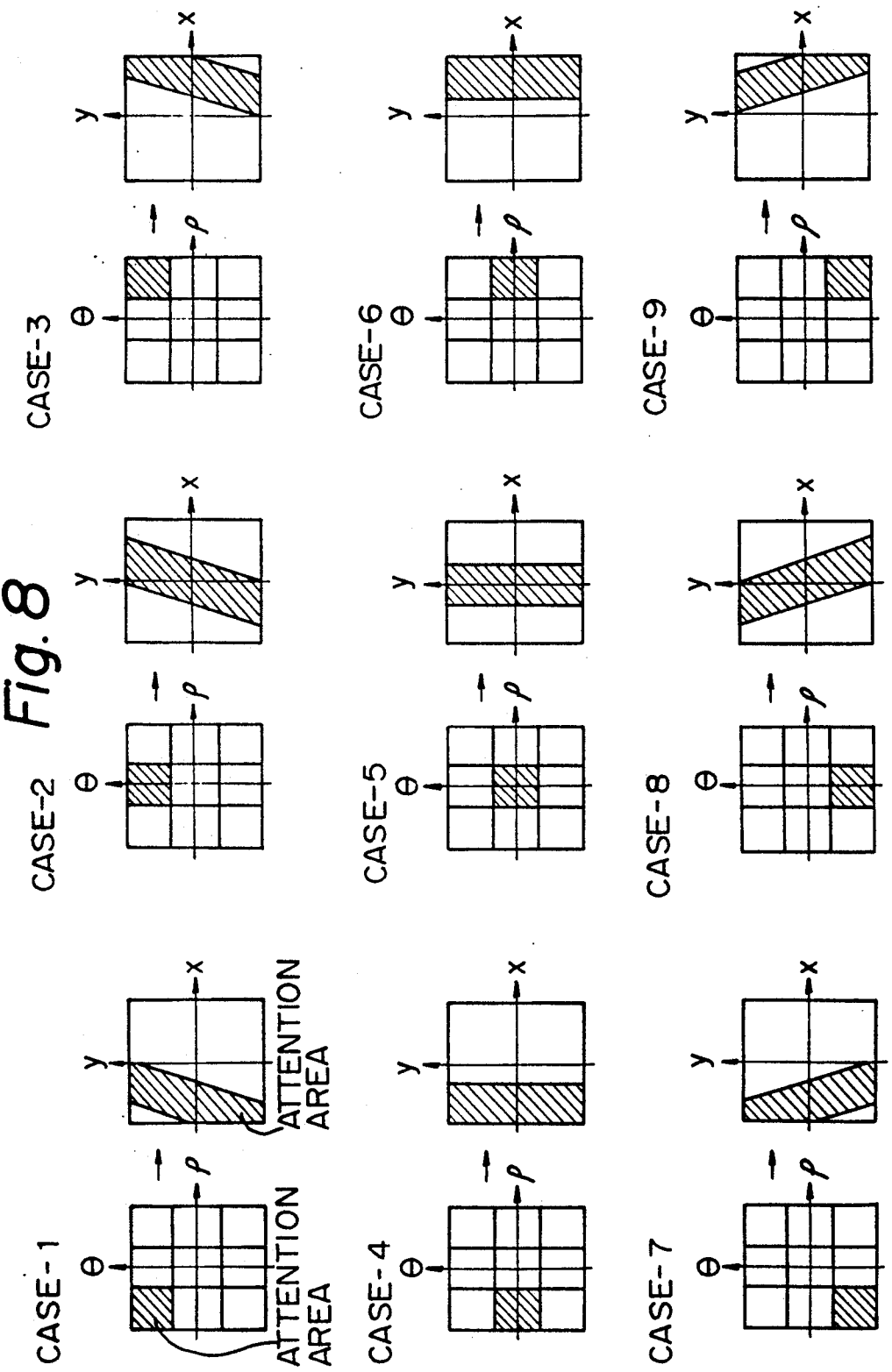
FIG. 8 shows examples of the correspondence between the estimated area in the $\rho$- $\theta$ space and the attention area in the picture image plane.

The table stored in the attention area table storage 41 is a table representing a conversion from an estimated area in the $\rho$- $\theta$ space to an attention area in the picture image plane, as illustrated, for example, in FIG. 8. In the attention area determination portion 43, an attention area in the picture image plane is determined in correspondence with an estimated area in the $\rho$- $\theta$ space by using the attention area table. The attention area storing portion 44 stores an attention area data determined in the attention area determination portion 43.

Examples of the correspondence between the estimated area in the $\rho$- $\theta$ space and the attention area in the picture image plane are shown in FIG. 8. In each of the cases in FIG. 8, the left part represents the $\rho$- $\theta$ space and the right part represents the picture image plane. The attention area having hatchings in the $\rho$- $\theta$ space corresponds to the attention area having hatchings in the picture image plane.

The operation of the system of FIG. 7 will be explained with reference to FIG. 10 showing a flow chart of the operation. A picture image data is received (S201), a color data is obtained (S202), an extracted point is derived by a logic filter (S203), parameters ($\rho$, $\theta$) are derived (S204), the parameters are integrated and the parameter densities are calculated (S205), the maximum density parameter is detected (S206), and the produced data is delivered (S207).

The decision whether the number of the extracted points is smaller than or equal to a predetermined threshold number or not is carried out (S208). When the decision is YES, the process proceeds to the steps S202 to S207. When the decision is NO, estimated parameters are calculated (S209), an attention area is determined by referring to the attention area table (S210), and the processings in the subsequent steps are carried out only within the attention area (S211).

Figure 9:
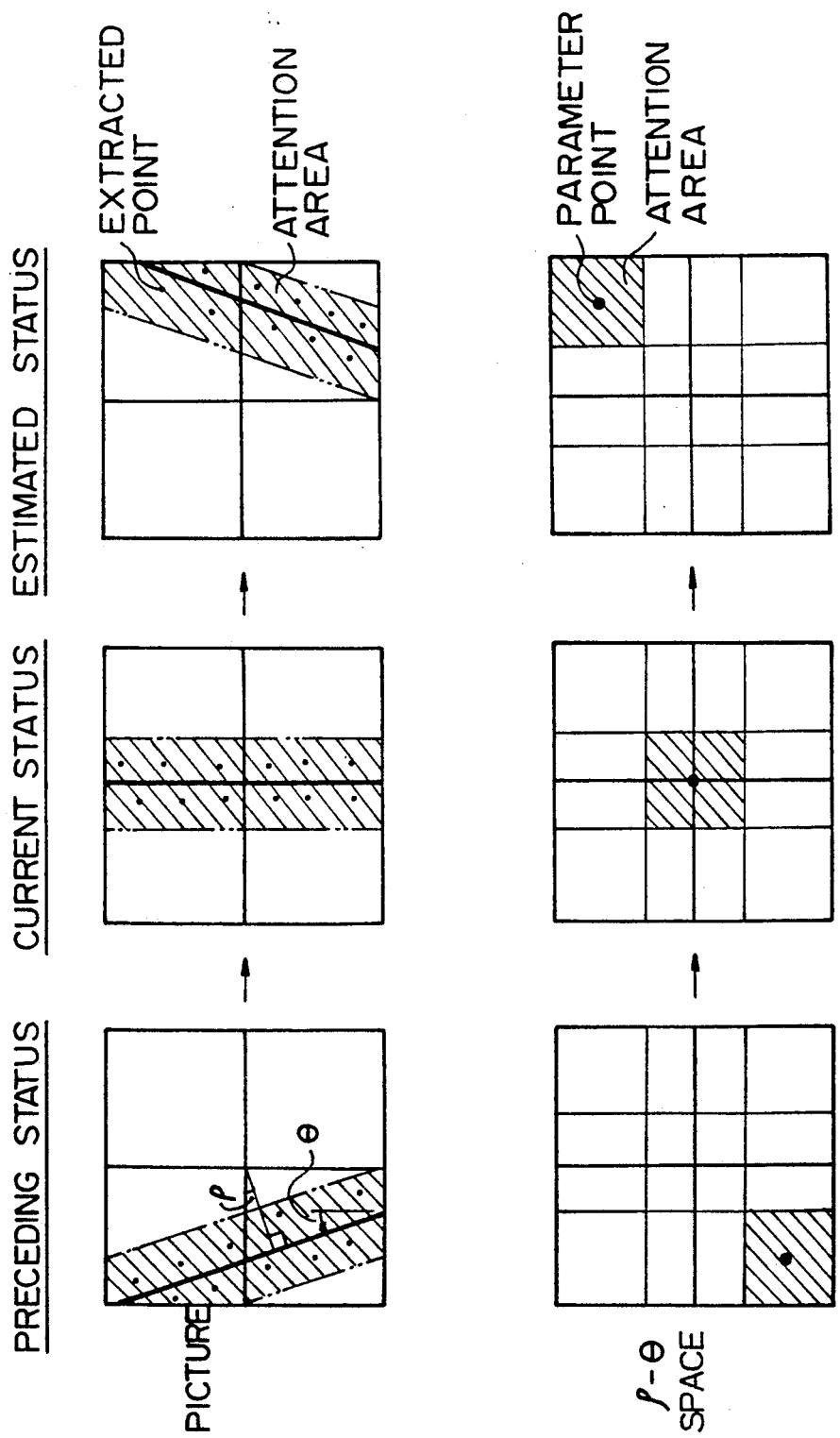
FIG. 9 shows an example of the estimation of the attention area by the system of FIG. 7.

An example of the estimation of the attention area by the system of FIG. 7 is shown in FIG. 9. The upper row of FIG. 9 illustrates the changes in the picture image plane from the preceding status through the current status to the estimated status, the lower row of FIG. 9 illustrates the changes in the $\rho$- $\theta$ space from the preceding status through the current status to the estimated status in correspondence with the upper row.

Point (1), point (2), and point (3) in the lower row correspond to line (1), line (2), and line (3) in the upper row, respectively. The square attention area having hatchings and containing point (1), the square attention area having hatchings and containing point (2), and the square attention area having hatchings and containing point (3) in the lower row correspond to a sequence of attention areas having hatchings in the upper low, respectively.

Based on the change from the attention area in the $\rho$- $\theta$ space for the preceding status to the attention area in the $\rho$- $\theta$ space for the current status, the attention area in the $\rho$- $\theta$ space for the estimated status is estimated.

As a modification of the system of FIG. 7, it is possible to supply the information of the number of the extracted points from the extracted point coordinate storing portion to the attention area determination portion as shown by a broken line in FIG. 7. In this modified system, the attention area determination portion 43 causes the parameter to be derived from the entirety of the picture plane when the number of the extracted points is less than a predetermined number, and the parameter to be derived from the attention area in the picture plane when the number of the extracted points is larger than the predetermined number.

As a further modification of the above-described modification of the system of FIG. 7, it is possible to provide an expanded attention area table storage 42 connected with the attention area determination portion 43 as shown by a broken line in FIG. 7. The width of the attention area in the attention area table stored in the expanded attention area table storage 42 is longer than the width of the attention area in the attention area table stored in the attention area table storage 41. In this further modified system, the attention area determination portion 43 causes the parameter to be derived from the expanded attention area converted based on the expanded attention area table when the number of the extracted points is less than a predetermined number, and the parameter to be derived from the attention area converted based on the attention area table when the number of the extracted points is larger than the predetermined number.

Thus, in the operation of the system of FIG. 7, the parameter deriving process is carried out only in the estimated attention area from the derived parameters of the guide line. Accordingly, the amount of data processing for deriving the parameters is reduced, the parameter of the guide line is determined at high speed, the introduction of noise data is effectively prevented, and thus the parameter of the guide line is obtained with high precision.

Figure 11A:
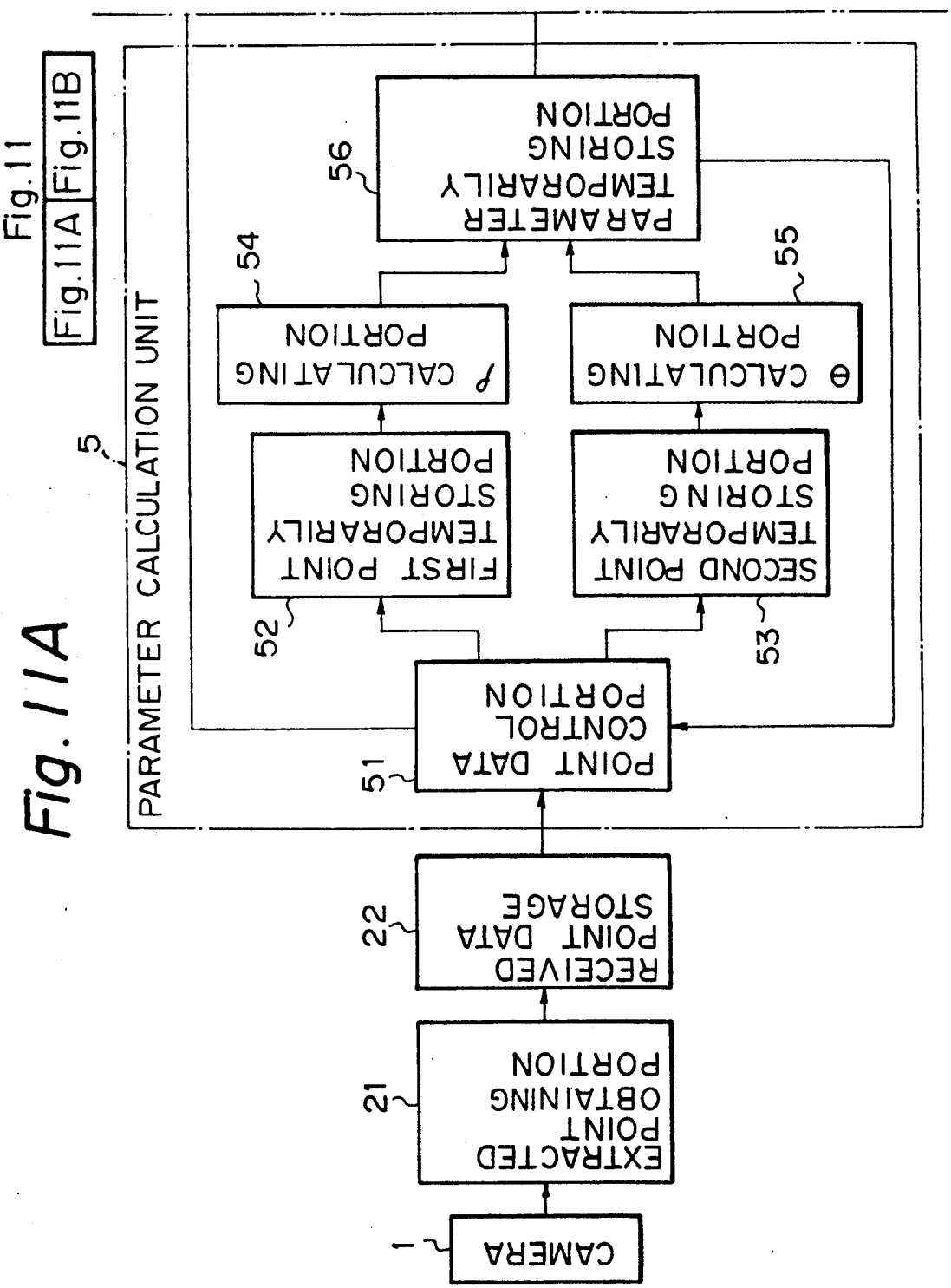
FIGS. 11A and 11B show a system for controlling an unmanned vehicle according to still another embodiment of the present invention.
Figure 11B:
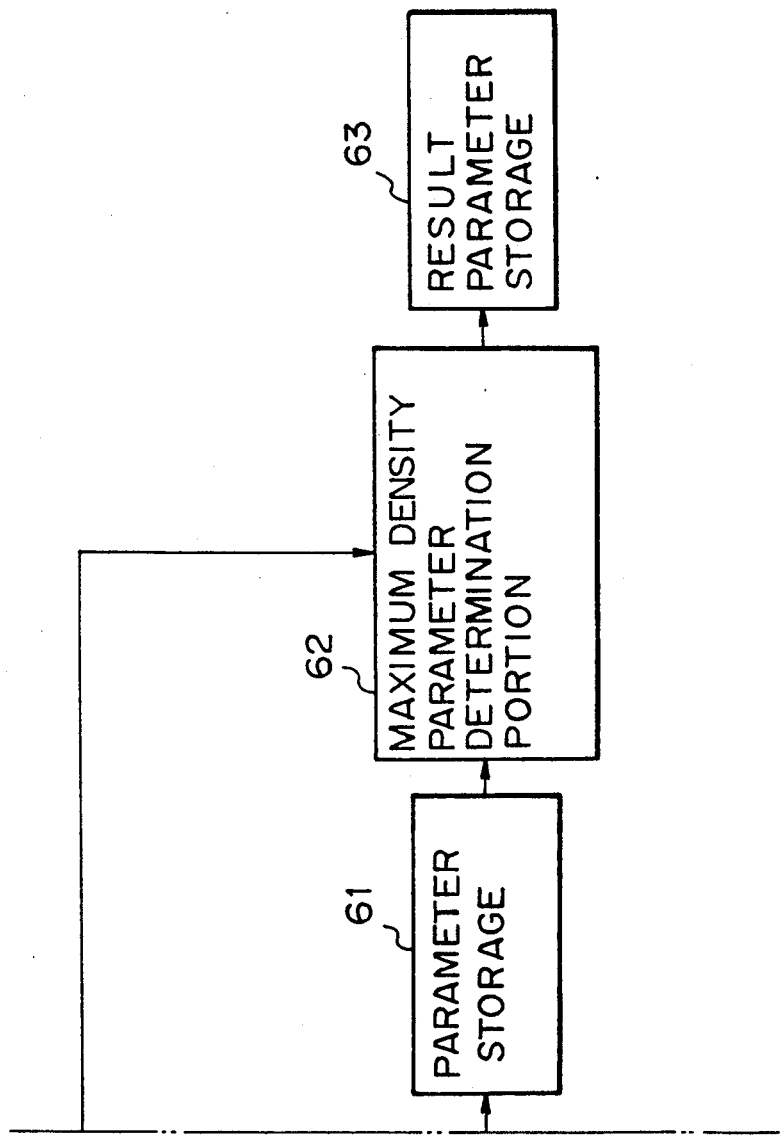

A system for controlling an unmanned vehicle according to still another embodiment of the present invention is shown in FIG. 11. The system of FIG. 11 includes a camera 1, an extracted point obtaining portion 21, a received point data storage 22, a parameter calculation unit 5, a parameter storage 61, a maximum density parameter determination portion 62, and a resultant parameter storage 63. The parameter calculation unit 5 includes a point data control portion 51, a first point temporary storing portion 52, a second point temporary storing portion 53, a $\rho$ calculating portion 54, a $\theta$ calculating portion 55, and a parameter temporary storing portion 56.

In the parameter calculation unit 5, a combination of the parallel component of a line segment connecting two of the extracted points read from the received point data storage 22 with respect to the estimated straight line which is longer than a predetermined threshold length, and the perpendicular component of the above-mentioned line segment with respect to the estimated straight line which is shorter than the predetermined threshold length is selected, or a selection of two of the extracted points read from the extracted points read from the received point data storage 22 each having a distance from the estimated straight line which is shorter than a predetermined threshold length is selected, and the parameters ($\rho$, $\theta$) of the line segment connecting these two points is calculated.

In the parameter storage 61, the parameter calculated in the parameter calculation unit 5 is stored. In the maximum density parameter determination portion 62, the parameters are integrated for each of the grid divided squares and based on the result of the integration the parameter for the square having the maximum density parameter is determined as the parameter of the guide line. In the resultant parameter storage 63, the determined parameter of the guide line is stored.

In the point data control portion 51, coordinates of two points from the supplied point data are received. These two point coordinate data are supplied to the first point temporary storing portion 52 and the second point temporary storing portion 53. The two points are selected such that either the parallel component of the two points with respect to the estimated straight line is longer than a predetermined threshold length and the perpendicular component of the above-mentioned two points is shorter than a predetermined threshold length, or the distance of the two points with respect to the estimated straight line is shorter than a predetermined threshold length. The data of the first of the two points is temporarily stored in the portion 52, and the data of the second of the two points in the portion 53. The coordinate of the first point is Xl and Yl, and the coordinate of the second point is X2 and Y2.

In the $\theta$ calculating portion 55, the value $\theta$ is calculated in accordance with the following equation.

$$\theta = \arctan\left(\frac{X2 - X1}{Y2 - Y1}\right)$$

And, in the $\rho$ calculating portion 55, the value $\rho$ is calculated in accordance with the following equation.

$$\rho = X1.\cos\theta + Y1.\sin\theta$$

The calculated values $\rho$ and $\theta$ are stored in the parameter temporary storing portion 56.

Figure 12A:
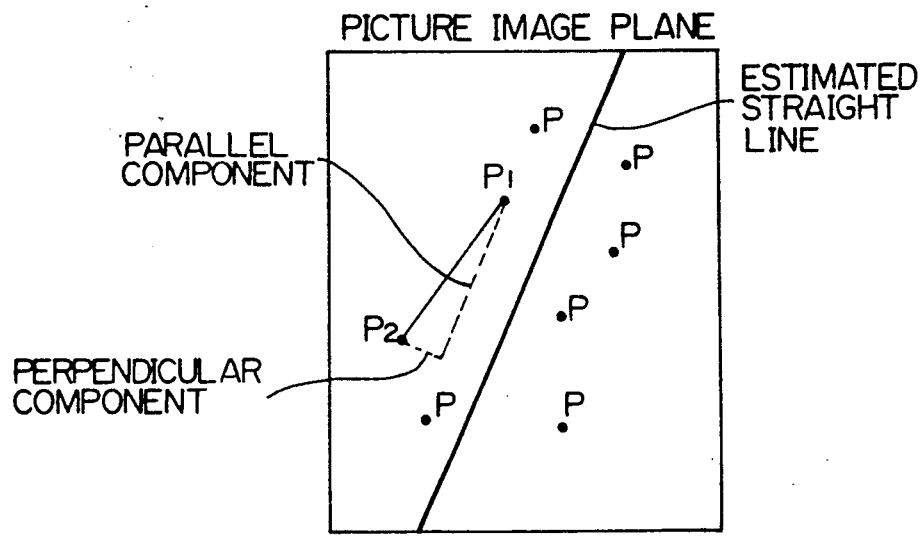
FIGS. 12A and 12B illustrate the parallel and perpendicular components of a line segment and the distance of a point with respect to an estimated straight line.
Figure 12B:
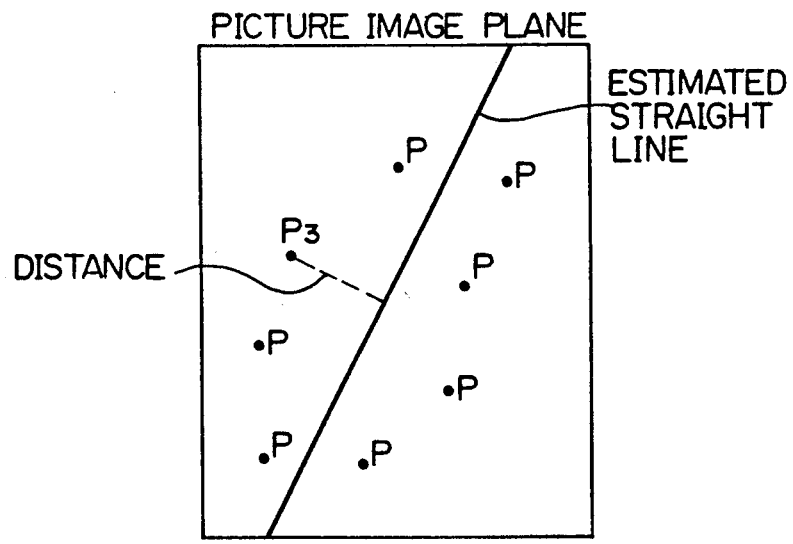

The parallel and perpendicular component of a linge segment connecting selected two points ($P_1$, $P_2$) with respect to the estimated straight line is illustrated in FIG. 12A, and the distance of a selected point ($P_3$) with respect to the estimated straight line is illustrated in FIG. 12B.

Figure 13:
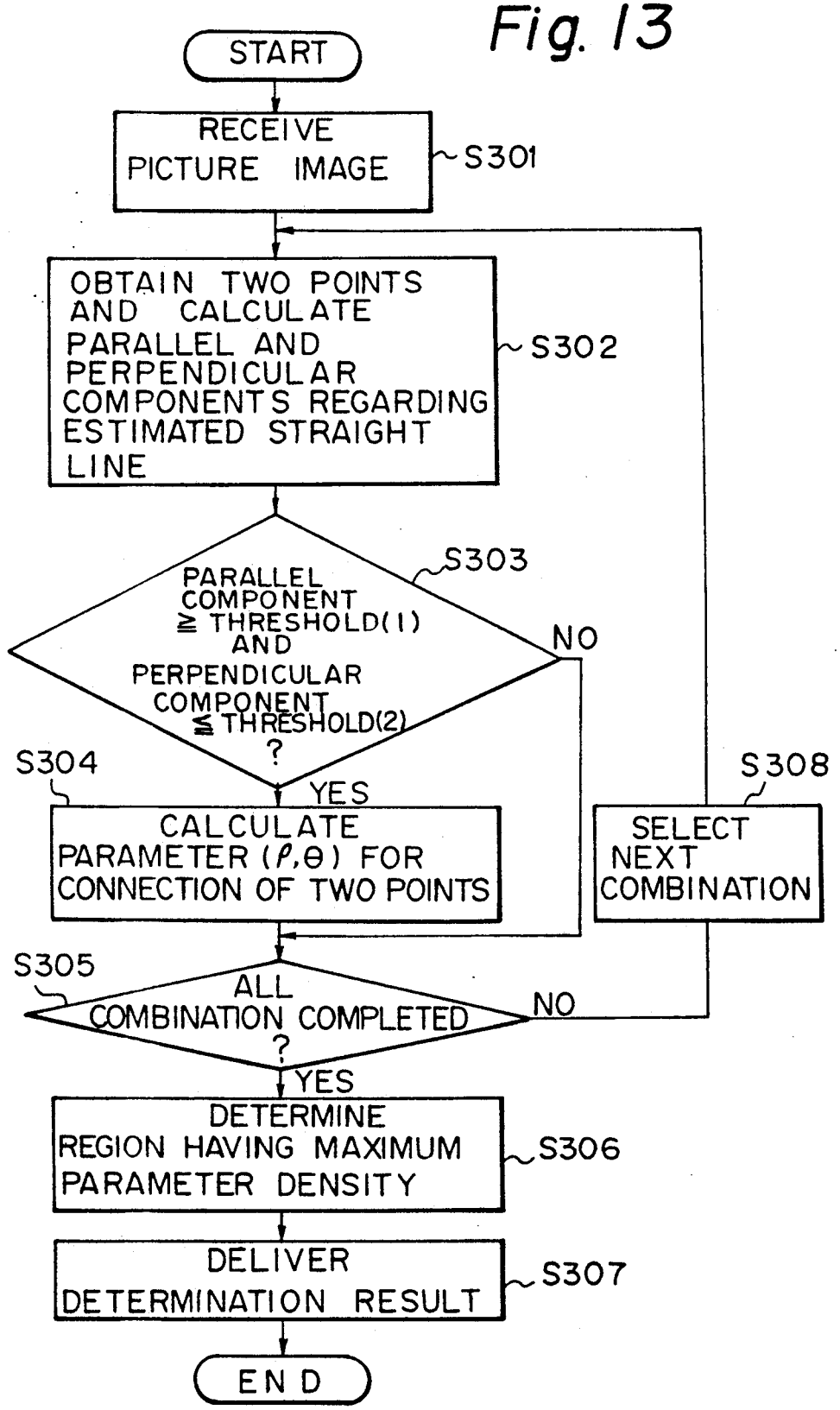
FIGS. 13 and 14 show flow charts of the operation of the system of FIG. 11.
Figure 14:
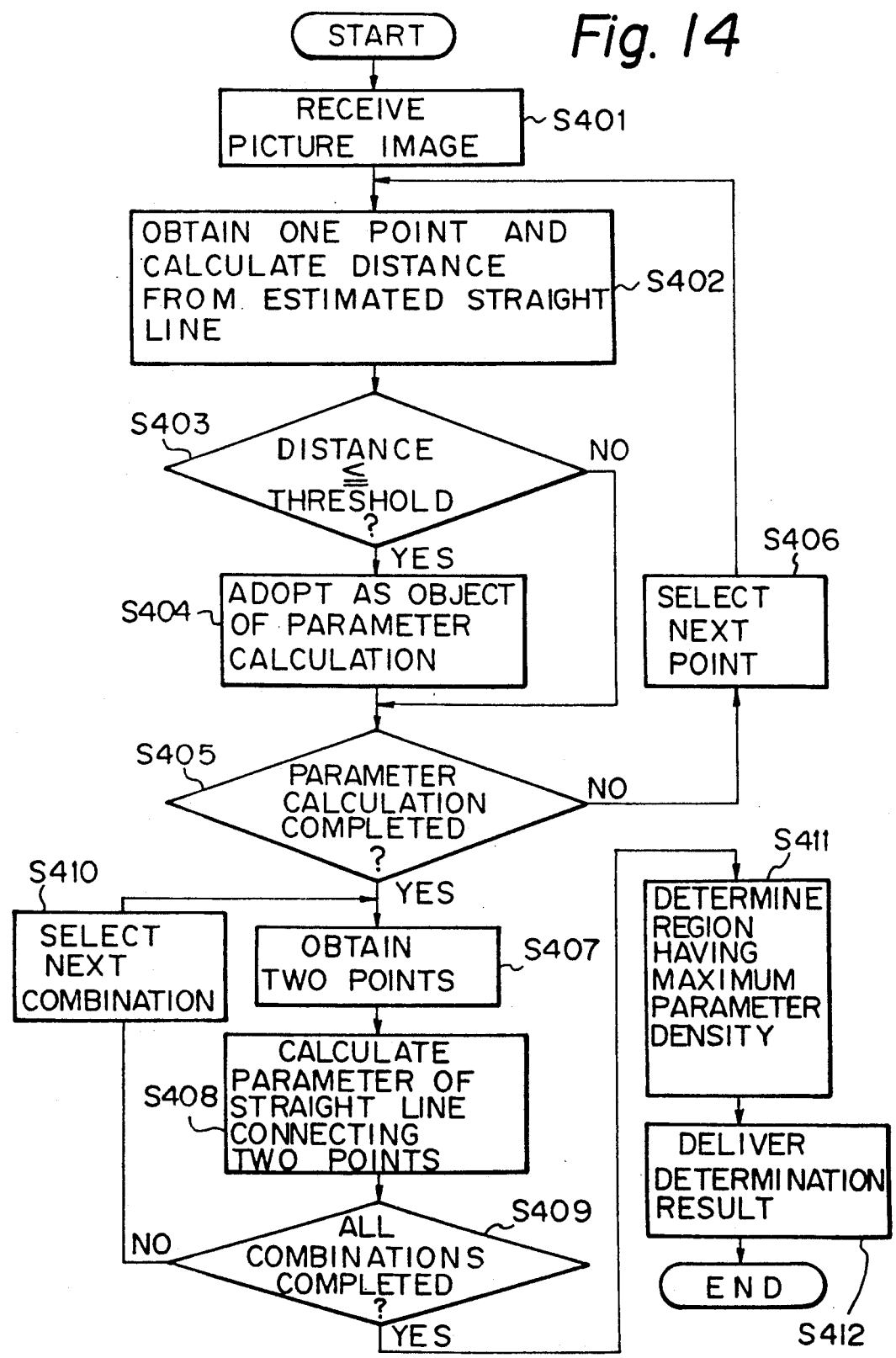

The operation of the system of FIG. 11 is explained with reference to FIG. 13 and FIG. 14 showing the flow charts of the operation.

In the flow chart of FIG. 13, picture images are received (S301), two points are obtained and parallel and perpendicular components regarding the estimated straight line are calculated (S302), and whether or not the parallel component is longer than or equal to a threshold length and whether or not the perpendicular component is shorter than or equal to a threshold length are decided (S303). When the decision is NO, the process proceeds to S305, and, when the decision is YES, the process proceeds to S304. The parameter for the connection of the two points is calculated (S304), and whether or not all combinations have been completed is decided (S305). When the decision is NO, the process proceeds to S308 in which the next combination is selected, and subsequently to S302, and, when the decision is YES, the process proceeds to S306. The region having the maximum parameter is determined (S306), and the result of the determination is delivered (S307).

In the flow chart of FIG. 14, picture images are received (S401), one point is obtained and the distance of the one point from the estimated straight line is calculated (S402). Whether or not the distance is shorter than or equal to a threshold length is decided (S403). When the decision is NO, the process proceeds to S405, and, when the decision is YES the process proceeds to S404 where the data in question is adopted as the object of parameter calculation.

Whether or not the parameter calculation is completed is decided in S405. When the decision is NO, the process proceeds to S406 when the next point is selected, and subsequently to S402, and when the decision is YES, the process proceeds to S407.

The data of two points is obtained (S407), the parameter of the straight line connecting the two points is calculated (S408), and whether or not all of the combinations are completed is decided (S409).

When the decision is NO, the process proceeds to S410 when the next combination is selected, and subsequently to S407, and when the decision is YES, the process proceeds to S411.

The region having the maximum parameter density is determined (S411), and the result of the determination is delivered (S412).

Thus, in the operation of the system of FIG. 11, the parameter deriving process including the straight line parameter calculation and the maximum density parameter determination is carried out only for the two points satisfying the condition that the parallel component with respect to the estimated straight line is longer than a predetermined threshold length and the perpendicular component with respect to the estimated straight line is shorter than a predetermined threshold length, or for the points having distances from the estimated straight line which is shorter than a predetermined length. Accordingly, the amount of data processing for deriving the parameters is reduced, the parameter of the guide line is determined at high speed, the introduction of noise data is effectively prevented, and thus the parameter of the guide line is obtained with high precision.

Figure 15:
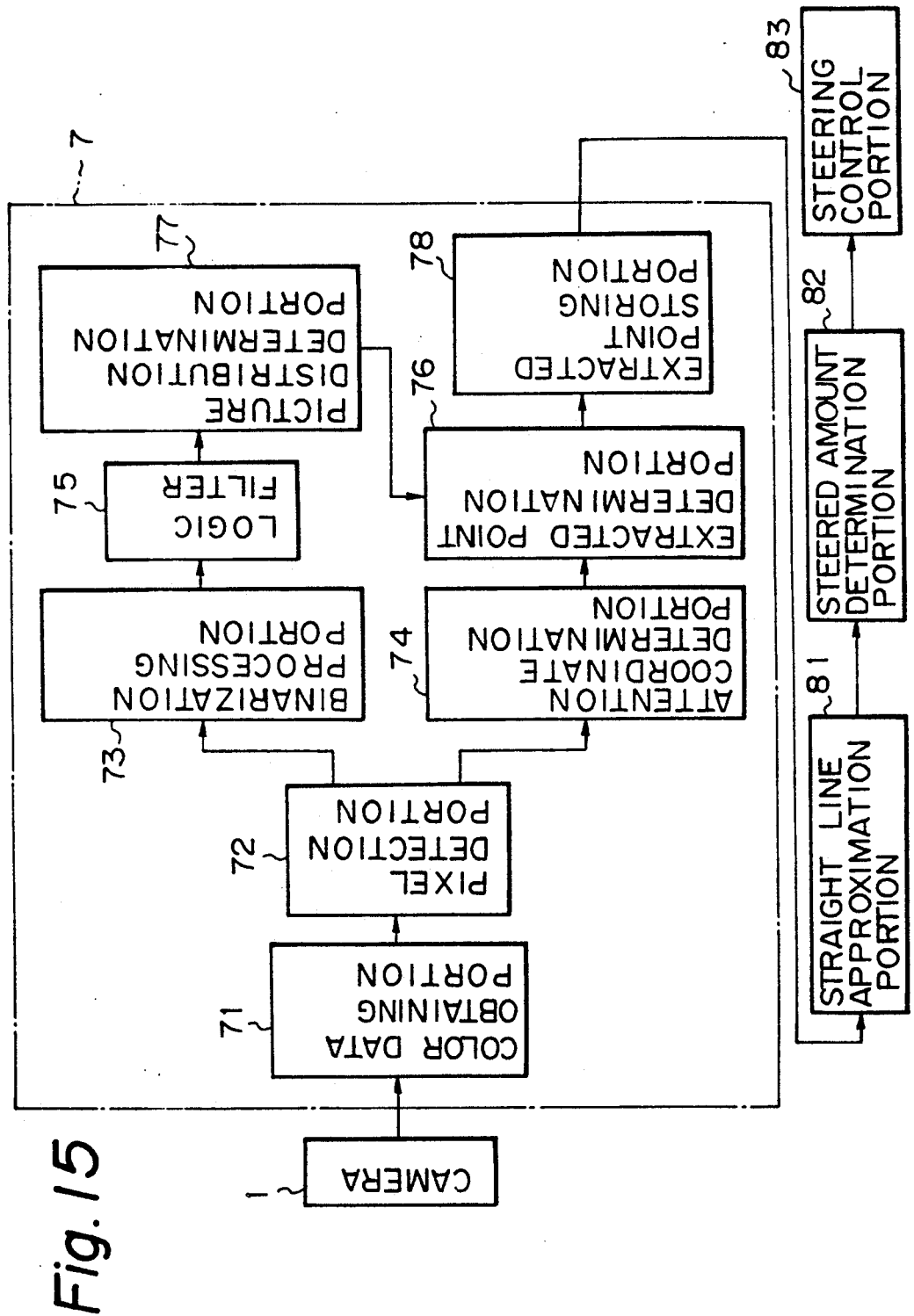
FIG. 15 shows a system for controlling an unmanned vehicle according to a further embodiment of the present invention.

A system for controlling an unmanned vehicle according to a further embodiment of the present invention is shown in FIG. 15. More detailed structures of portions of the system of FIG. 15 are shown in FIGS. 16, 17, and 18.

Referring to FIG. 15, the system includes a camera 1, a picture data processing unit 7 having a color data obtaining portion 71, a pixel detection portion 72, a binarization processing portion 73, an attention coordinate determination portion 74, a logic filter 75, an extracted point determination portion 76, a picture distribution determination portion 77, an extracted point storing portion 78, a straight line approximation portion 81, a steered amount determination portion 82, and a steering control portion 83.

Figure 16B:
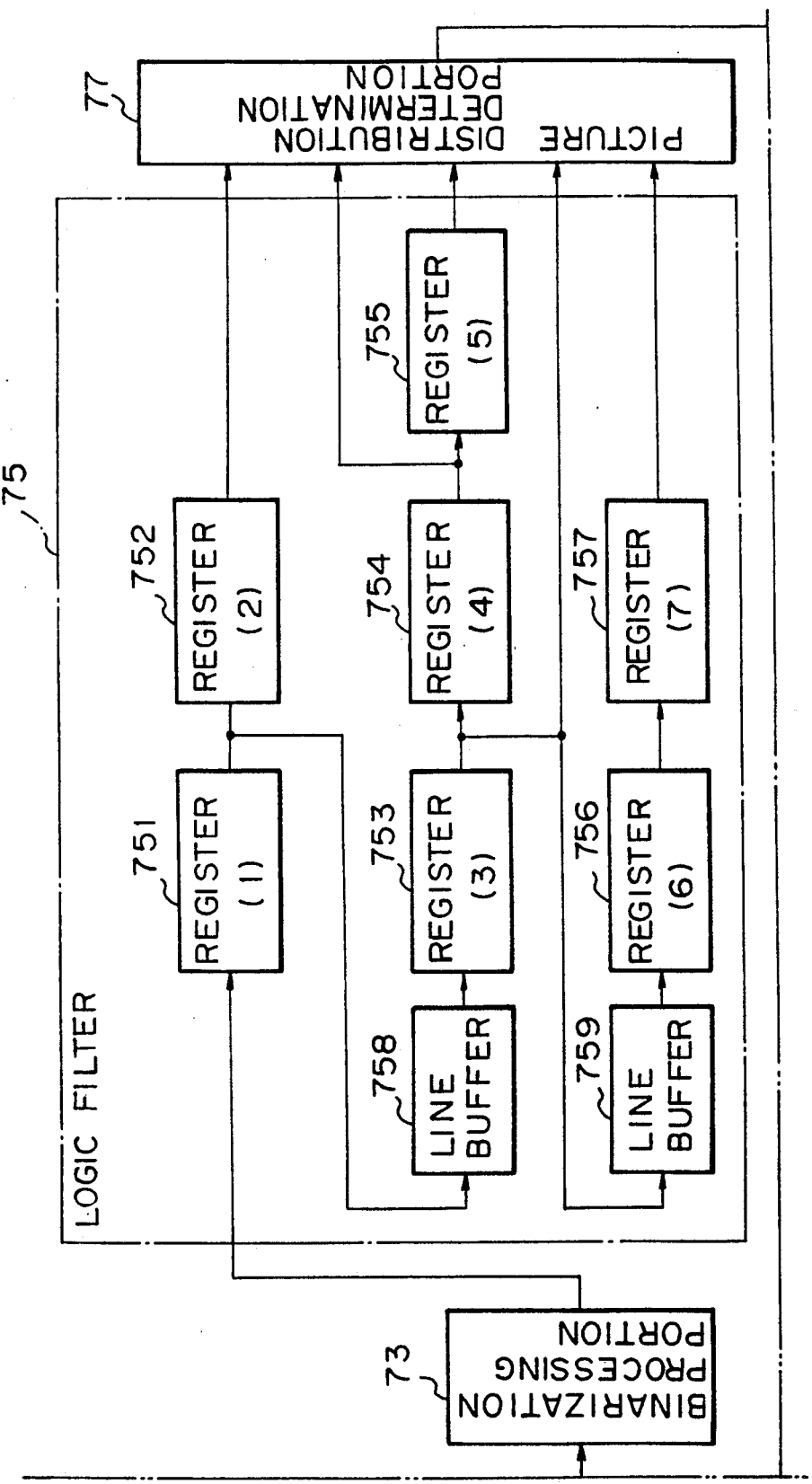
Figure 16C:
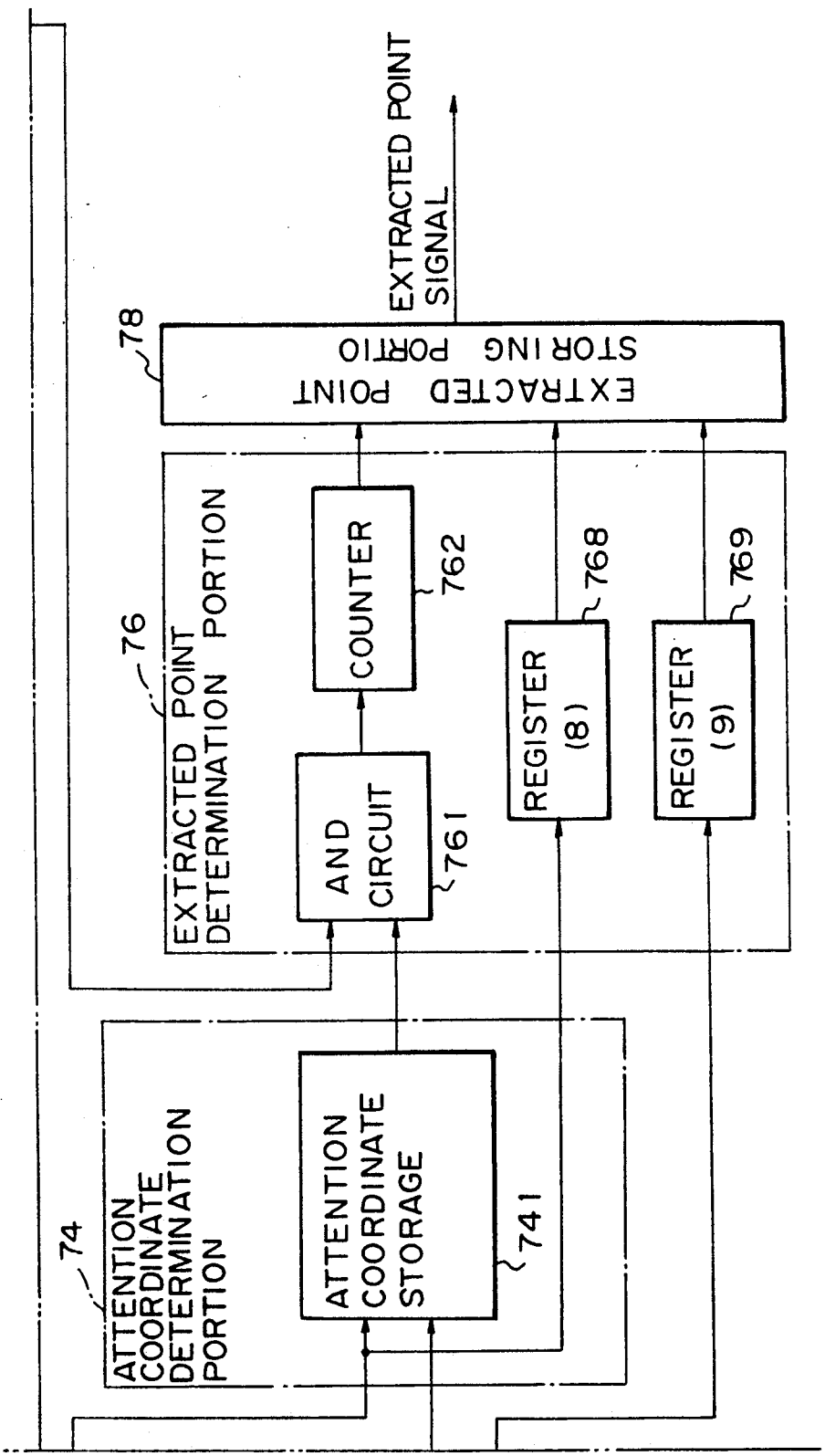

The structure of the picture data processing unit 7 is illustrated in FIG. 16. In FIG. 16, the color data obtaining portion 71 includes a specific color calculation device 711, a color intensity calculation device 712, and a comparator device 713. The pixel detection portion 72 includes an analog-to-digital conversion device 721, a synchronization signal separating device 722, an X-coordinate generating device 723, and a Y-coordinate generating device 724. The logic filter 75 includes registers 751 to 757 and line buffers 758 and 759. The attention coordinate determination portion 74 includes an attention coordinate storage 741. The extracted point determination portion 76 includes an AND circuit 761, a counter 762, and registers 768 and 769.

Figure 17:
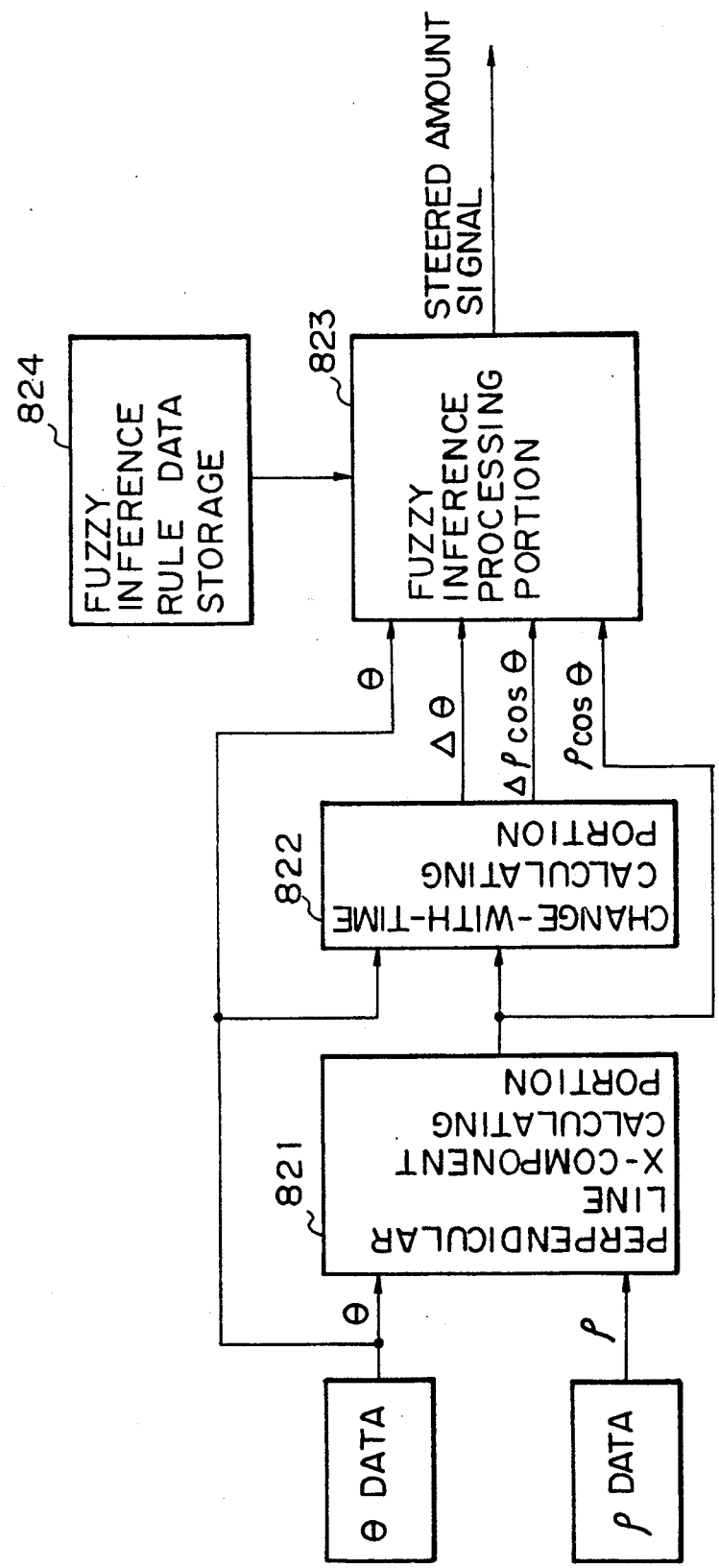
FIG. 17 shows the structure of the steered amount determination portion in the system of FIG. 15.
Figure 18B:
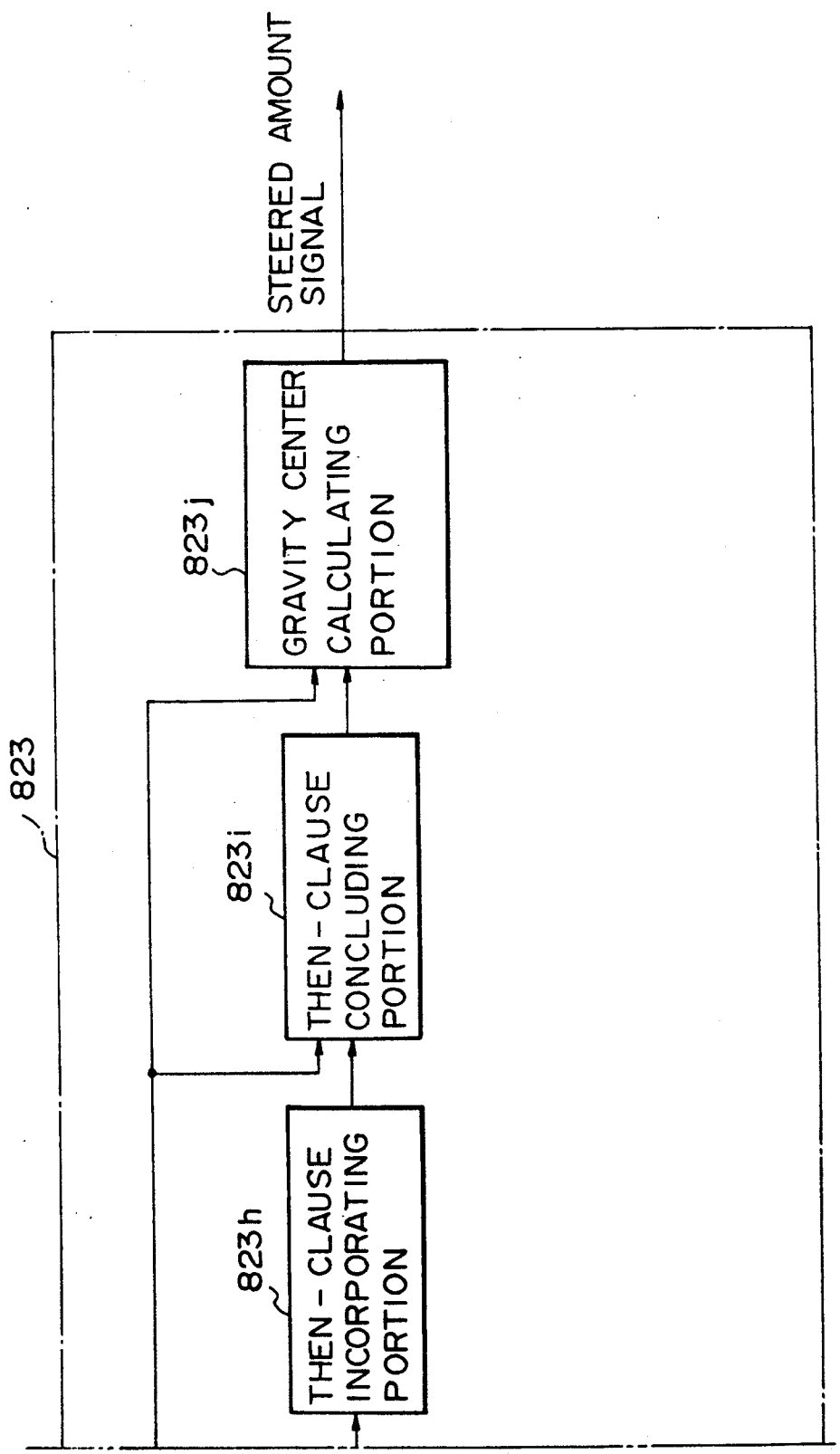

The structure of the steered amount determination portion 82 is shown in FIG. 17. The structure of FIG. 17 includes a perpendicular line X-component calculating portion 821, a change-with-time calculating portion 822, a fuzzy inference processing portion 823, and a fuzzy inference rule data storage 824.

The structure of the fuzzy inference processing portion 823 is shown in FIG. 18. The structure of FIG. 18 includes a fuzzy inference rule retrieving portion 823a, a membership function data storage 823b, a received parameter temporary storing portion 823c, a then-clause membership function data storage 823d, an if-clause membership function data storage 823e, a then-clause restricting portion 823f, an if-clause reliability calculating portion 823g, a then-clause incorporating portion 823h, a then-clause concluding portion 823i, and a gravity center calculating portion 823j.

Referring to FIG. 15, the extracted point data is obtained by locating an attention pixel surrounded by a predetermined picture distribution in the picture data processing unit 7. In the color data obtaining portion 71, picture image signals having a ratio of the intensity of a specific color to that of the sum of the three primary colors, i.e., R, G, and B which is greater than a predetermined ratio, are derived. In the pixel detection portion 72, pixel coordinates and pixel values are detected. In the attention coordinate determination portion 74, it is determined whether or not the detected pixel coordinate is a preliminarily stored attention coordinate. In the binarization processing portion 73, the detected pixel value is binarized. In the logic filter 75 as a video speed delay storing device, the binary data is delayed in accordance with timing of delivery of the output of the binarization processing portion 73. In the picture distribution determination portion 77, it is determined whether or not the received predetermined number of pixels are a predetermined combination of values. In the extracted point determination portion 76, the pixel coordinate is delivered as the extracted point coordinate based on the received results of the attention coordinate determination and the picture distribution determination.

In the straight line approximation portion 81, a straight line is derived in correspondence with the guide line on the road. In the steered amount determination portion 82, a steered amount is determined based on the result of the derivation of the straight line. This determination is carried out by suing the parameter including an X-direction component of the perpendicular line from a predetermined reference point to the guide line in the picture plane, and a change-with-time of the parameter. In the steering control portion 83, control of a steered amount is carried out based on the determined steered amount and the current steered amount.

The picture data processing unit 7 will be explained with reference to FIG. 16. The picture data from the camera is supplied to the specific color calculation device 711 and the color intensity calculation device 712. In the specific color calculation device 711, the intensity of the color of the guide line, the designated color, or the like is calculated. The intensity of a color is represented by the ratio of the intensity of the color to the sum of the intensities of the three primary colors R, G, and B. In the color intensity calculation device 712, the sum of the intensities of the three primary colors R, G, and B, is calculated. In the comparator device 713, it is determined whether or not the ratio of the intensity of the specific color to the sum of the intensities of the three primary colors is greater than a predetermined ratio, and delivers the signal of the specific color only when the determination is affirmative. This makes it possible to detect the color in question correctly regardless of brightness or darkness conditions.

In the analog-to-digital conversion portion 721, the color signal is converted into a digital signal which is supplied to the binarization processing portion 73 and the synchronization signal separating portion 722. In the synchronization signal separating portion 722, a synchronization signal for X-coordinate generation which is to be supplied to the X-coordinate generating portion 723 is derived, and a synchronization signal for Y-coordinate generation which is to be supplied to the Y-coordinate generating portion 724 is derived. For example, the synchronization signal for X-coordinate generation is a horizontal synchronization signal, and that for Y-coordinate generation is a vertical synchronization signal. The coordinates for the current color signal are produced in the X-coordinate generating portion 723 and the Y-coordinate generating portion 724 and are supplied to the attention coordinate storage 74 in the attention coordinate determination portion 74 and the registers 768 and 769 in the extracted point determination portion 76. The attention coordinates are preliminarily stored in the attention coordinate storage 741. In the attention coordinate determination portion 74, it is determined whether or not the supplied X-coordinate and Y-coordinate are the attention coordinates, and when the determination is affirmative the signal indicating the coincidence is supplied to the AND circuit 761 in the extracted point determination portion 76.

In the binarization processing portion 73, the digital signal from the analog-to-digital conversion portion 721 is binarized with reference to a predetermined threshold value. In the logic filter 75 as a video speed delay storing portion, the binarized signal from the binarization processing portion 73 is supplied to the register 751. The output of the register 751 is supplied to the register 752 and the line buffer 758. The output of the line buffer 758 is supplied to the register 753. The output of the register 753 is supplied to the register 754 and the line buffer 759. The output of the register 754 is supplied to the register 755. The output of the line buffer 759 is supplied to the register 756. The output of the register 756 is supplied to the register 757. Each of the line buffers 758 and 759 is a register for registering dots of one scan line of the television camera. The data of the dots of one scan line is shifted successively in the line buffer. A video speed delay storing operation is carried out by shift registering in the line buffers, and by registering in the other registers.

The outputs of the registers 52, 753, 754, 755, and 757 are supplied to the picture distribution determination portion 77. In the registers 752, 753, 754, 755, and 757, the binarized data of the coordinates of the dots which are located in the upper, lower, left, and right sides of the location represented by the register 754, are registered. In the picture distribution determination portion 77, it is determined whether or not the pattern of the data of the upper, lower, left, and right sides is a predetermined pattern, and when the determination is affirmative, the signal "1" is supplied from the portion 77 to the AND circuit 761 in the extracted point determination portion 76.

When an attention coordinate is detected in the attention coordinate determination portion 74, the signal "1" is supplied from the attention coordinate determination portion 74 to the AND circuit 761. Thus, when a signal "1" is supplied to both inputs of the AND circuit 761, the signal "1" is supplied to the counter 762. The thus counted output of the counter 762 and the outputs of the registers 768 and 769 are supplied to the extracted point storing portion 78 when the output of the AND circuit is signal "1". Thus, in the extracted point storing portion 78, the coordinates which are determined as predetermined attention coordinates by the attention coordinate determination portion and determined as a predetermined pattern by the picture distribution determination portion 77, are stored successively.

In each of the color data obtaining portion 71, the pixel detection portion 72, the binarization processing portion 73, the logic filter 75, the attention coordinate determination portion 74, the picture distribution determination portion 77, and the extracted point determination portion 76, the processing is carried out each time a picture data is supplied. Accordingly, in the arrangement shown in FIG. 16, the data of an extracted point can be obtained in a real time manner, and the processing of the data of the extracted point can be carried out in a real time manner. Therefore, a memory device having a great capacity such as that needed for storing the entirety of the picked-up data of one picture, is not necessary.

The steered amount determination portion 82 will be explained with reference to FIG. 17. The data of $\theta$ is supplied to a perpendicular line X-component calculating portion 821, a change-with-time calculating portion 822, and a fuzzy inference processing portion 823. The data of $p$ is supplied to the perpendicular line X-component calculating portion 821.

In the perpendicular line X-component calculating portion 821, the X-component of the perpendicular line from the reference point to the straight guide line is calculated to produce the value $pcos\theta$. The output of the portion 821 is supplied to the change-with-time calculating portion 822 and the fuzzy inference processing portion 823.

In the change-with-time calculating portion 822, the change with time $\Delta\theta$ and $\Delta pcos\theta$ of the $\theta$ and 'cos$\theta$ with regard to a specific time unit such as one picture image unit concerning the television camera, are calculated. The outputs of the portion 822 are supplied to the fuzzy inference processing portion 823. In the fuzzy inference processing portion 823, steered amount is determined based on the values $\theta$, $pcos\theta$, $\Delta pcos\theta$, etc. A fuzzy inference rule data storage 824 is connected to the fuzzy inference processing portion 823. In the fuzzy inference processing portion 823, a steered amount is determined by using the data of the rules stored in the fuzzy inference rule data storage 824.

Referring to FIG. 18, the structure and operation of the fuzzy inference processing portion 823 are described. In the received parameter temporary storing portion 823c, the received parameters, such as $\theta$, $\Delta\theta$, $pcos\theta$, and $\Delta pcos\theta$ are temporarily stored. In the membership function data storage 823b, the distribution of the membership function is stored for each kind of membership function. In the fuzzy inference rule retrieving portion 823a, the fuzzy rules stored in the fuzzy inference rule storage are retrieved successively, membership functions corresponding to the predicates contained in if-clauses or then-clauses of the fuzzy inference rules are derived by retrieving the membership function data stored in the storage 823b, and the derived membership function is stored in the if-clause membership function data storage 823e or the then-clause membership function data storage 823d. A function which always assumes a value "0" is stored into the then-clause membership function data storage 823d at the start of a retrieve operation of the fuzzy inference rule retrieving portion 823a.

In the if-clause reliability calculating portion 823g, the reliabilities of the predicates are calculated by substituting the membership function stored in the if-clause membership function data storage 823e with the received parameter stored in the received parameter temporary storing portion 823c, the minimum value of the calculated reliability is then determined, and the derived minimum value is supplied to the then-clause restricting portion 823f as a degree of the if-clause reliability.

In the then-clause restricting portion 823f, the then-clause membership function data stored in the then-clause membership function data storage 823d is restricted by the if-clause reliability degree, i.e., is treated to provide the minimum value, to produce the function distribution which is supplied to the then-clause incorporating portion 823h.

In the then-clause incorporating portion 823h, the maximum value between the function distribution supplied from the then-clause restricting portion 823f and the function distribution preliminarily stored in the then-clause concluding portion 823i is determined for each variable, and the determined maximum value is resultingly supplied to the then-clause concluding portion 823i.

In the fuzzy inference value retrieving portion 823a, an instruction is produced to cause a start of the operation of the gravity center calculating portion 823j when the retrieve operation of the fuzzy rule is completed. In the gravity center calculating portion 823j, the center of gravity of the function distribution stored in the then-clause concluding portion 823i is determined, and the signal of the determined center of gravity is delivered as the signal of the steered amount. It is noted that the center of gravity of function f(x) can be determined by calculating Ex.f(x).

Figure 19:
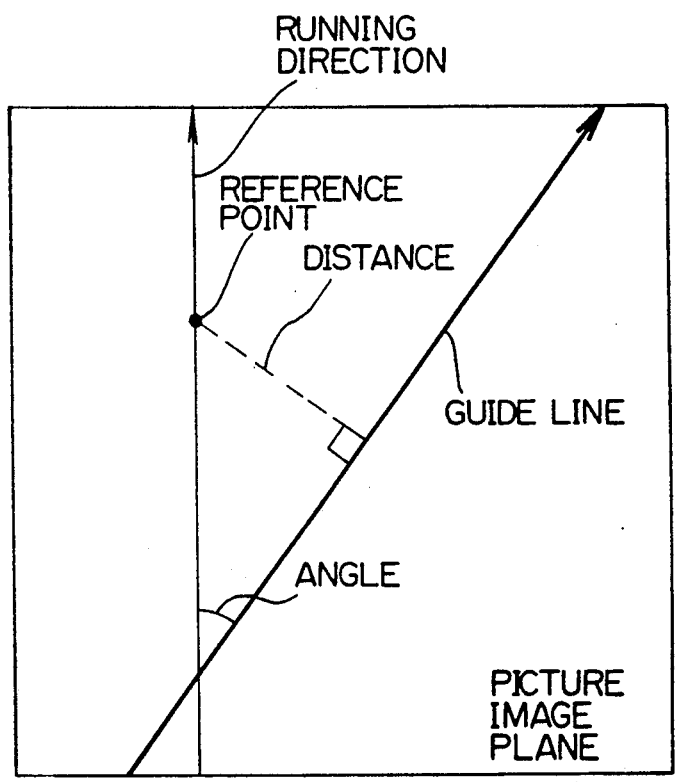
FIGS. 19 and 20 illustrate an example of steering decision by using the fuzzy inference.
Figure 20:
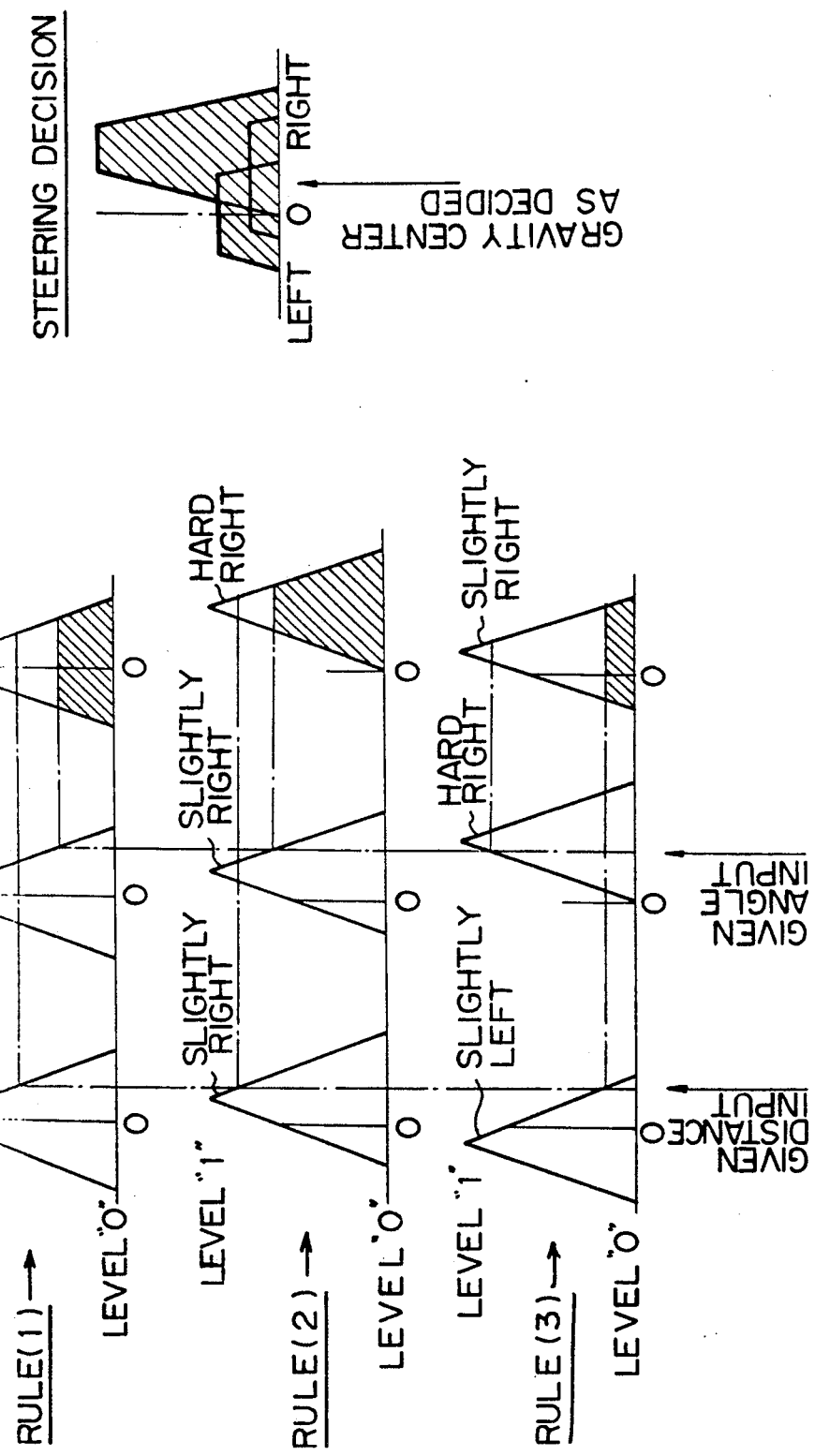

In the steering control, a human steering operation is combined with guide line recognition by using fuzzy inference. An example of a steering decision by using the fuzzy inference is shown in FIG. 19 and 20. An example of a picture image plane displaying the running direction of the vehicle and the guide line is illustrated in FIG. 19.

In the fuzzy inference, an "if-then" format, such as "if a given variable is so and so, then the steering is decided as so and so", is used. An example of the process of the steering decision is as follows.

(step 1) The steered amount of the vehicle is inferred for each fuzzy rule.

(substep 1.1) Enter the guide line data in the membership functions of each variable in the if-clause and calculate reliability.

(substep 1.2) Since the variables in the IF-clause are combined by AND logic, calculate the reliability of the if-clause as the minimum value of the reliability obtained in the substep 1.1.

(substep 1.3) Restrict the membership functions of the then-clause to a trapezoidal form using the reliability of the if-clause.

(step 2) All the inference results of the fuzzy inferences are integrated to calculate the steered amount.

(substep 2.1) Overlay the trapezoidal distributions of all fuzzy inferences to obtain the maximum value.

(substep 2.2) Determine the gravity center of the graphic produced by overlaying the trapezoidal distributions as the steered amount.

The example of the process of the steering decision is illustrated in FIG. 20. Rules (1), (2), and (3) concerning the membership function of the fuzzy inference are illustrated in three rows, each illustrating a sequence of the distance condition, the angle condition, and the steered amount determination. The result of the fuzzy inference is illustrated in the right part of FIG. 20 as the steering decision.

Examples of the table of the relationship between the if-clause and then-clause by the fuzzy inference are shown in FIG. 21 and FIG. 22. In the example of FIG. 21, the conditions of $\rho\cos\theta$ and $\theta$ are indicated in the if-clause column, and the determination of steered amount is indicated in the then-clause column. In the example of FIG. 22, the conditions of $\rho\cos\theta$ and $\Delta\rho\cos\theta$ are indicated in the if-clause column, and the determination of steered amount is indicated in the then-clause column.

Thus, in the operation of the system of FIG. 15, the processing of the received picture image data is carried out in a real time manner at high speed using relatively small capacity memory devices, the control of the steering of the vehicle using the result of the picture image data processing is reliably carried out, and thus the control of the unmanned vehicle is carried out satisfactorily.

We claimed:

1. A system for controlling an unmanned vehicle by detection of a guide line based on a picture image picked up by a camera on said vehicle, said system comprising:

parameter ($\rho$, $\theta$) deriving means for deriving parameters ($\rho$, $\theta$) of a point extracted from a picture image picked up by a camera; and maximum density parameter detection means for integrating the densities of parameters derived by said parameter deriving means and determining the maximum density parameter from the integrated densities of the parameters;

the maximum density parameter being determined from the parameter derived by said parameter deriving means for the parameter area having at the center thereof the parameter estimated from the maximum density parameter;

said detected maximum density parameter being decided as the parameter of said guide line.

2. A system according to claim 1, wherein the parameter area is expanded when the number of parameters in the parameter area becomes less than a predetermined number, and the parameter area is reduced when the number of parameters in the parameter area becomes larger than the predetermined number.

3. A system for controlling an unmanned vehicle by detection of a guide line from a picture image picked up by a camera on said vehicle, said system comprising:

parameter ($\rho$, $\theta$) deriving means for deriving parameters ($\rho$, $\theta$) of a point extracted from a picture image picked up by a camera;

maximum density parameter detection means for integrating the densities of parameters derived by said parameter deriving means and deciding the maximum density parameter from the integrated densities of the parameters;

estimated parameter area calculating means for estimating a possible parameter area from past parameters of the maximum density detected by said maximum density parameter detection means; and attention region table storing means for storing a table for converting an estimated parameter area estimated by said estimated parameter area calculating means into the corresponding attention region on the picture image;

parameters being derived by said parameter deriving means with regard to extracted points in the attention region converted by said attention region table storing means;

the parameter of the maximum density being detected from the derived parameters by said maximum density parameter detection means to be delivered as the parameter of said guide line.

4. A system according to claim 3, wherein the attention region is expanded when the number of the extracted points in the attention region becomes less than a predetermined number, and the attention region is reduced when the number of the extracted points in the entire region or the attention region becomes larger than the predetermined number.

5. A method for controlling an unmanned vehicle by detection of a guide line from a picture image picked up by a camera on said vehicle in which a straight line approximation process is used for calculating an approximate straight line from received point data, said straight line approximation process comprising the steps of:

selecting a combination in which a parallel component of a line segment connecting two points from the received point data with respect to an estimated straight line is longer than a predetermined threshold length and a perpendicular component of the above-indicated line segment with respect to the estimated straight line is shorter than a predetermined threshold length by using a parameter calculation device;

calculating parameters ($\rho$, $\theta$) of the line segment connecting the selected two points by using the parameter calculation device;

integrating the parameters ($\rho$, $\theta$) calculated by the parameter calculation device; and determining parameter coordinates ($\rho$, $\theta$) having the maximum parameter density as the parameter of the approximate straight line.

6. A system for controlling an unmanned vehicle by detection of a guide line from a picture image picked up by a camera on said vehicle in which a straight line approximation process is used for calculating an approximate straight line from received point data, comprising the steps of:

selecting points each having a distance less than a predetermined threshold length from an estimated straight line by using parameter calculation means; and calculating parameters ($\rho$, $\theta$) of straight lines passing through one of the selected points or parameters ($\rho$, $\theta$) of a line segment connecting two of the selected points by using the parameter calculation means;

the parameters of the estimated straight line being determined from the result of said calculation.

7. A method according to claim 6, wherein integration of parameters ($\rho$, $\theta$) calculated by said parameter calculation means is repeated for each of grid divided squares and the parameters for a square having the maximum density parameter are determined as the parameters of the approximate straight line.

8. A system for controlling an unmanned vehicle by detection of a guide line from a picture image picked up by a camera on said vehicle, said system comprising:

picture picking-up means for picking up a picture image of a road on which said vehicle is running;

picture processing means for deriving color data from the picked-up picture image, and deriving a predetermined attention pixel having a predetermined picture image distribution around the same as an extracted point;

straight line approximation means for deriving a straight line data of the guide line on the road on which said vehicle is running from said extracted point data; and steered amount determination means for determining a steered amount of said vehicle based on the straight line data by said straight line approximation means, and steering control means for controlling a steering of said vehicle based on a steered amount determined by said steered amount determination means and a current steering status.

9. A system according to claim 8, wherein said picture processing means comprises:

color obtaining means for extracting only a picture image signal having an intensity greater than a predetermined intensity from a received color picture image;

pixel detection means for detecting a pixel coordinate and pixel value from the picture image signal extracted by said color obtaining means;

attention coordinate determination means for determining whether or not the detected pixel coordinate is a stored attention pixel coordinate;

binarization processing means for transforming the detected pixel value into a binary data;

video speed delay storing means for transmitting the binary data in accordance with an output timing of said binarization processing means;

pixel distribution detection means for receiving a predetermined plurality of pixel values out of the binary data transmitted through said video speed delay storing means and determining whether or not the received pixel values are a predetermined combination of values; and extracted point determination means for determining a pixel coordinate as the extracted point coordinate and supplying the determined pixel coordinate to said straight line approximation means when the detected pixel coordinate is determined as the stored attention signal by said attention coordinate determination means and the received pixel values are determined as the predetermined combination of values by said pixel distribution detection means.

10. A system according to claim 10, wherein a steered amount is determined based on a parameter containing an X-directional component of a perpendicular line from a reference point on the picture image to a guide line picture image.

11. A system according to claim 10, wherein a steered amount is determined based on change with time of a parameter containing an X-directional component of a perpendicular line from a reference point on the picture image to a guide line picture image.

12. A system according to claim 8, wherein a fuzzy inference is used for determining a steered amount.

* * * * *

UNITED STATES PATENT AND TRADEMARK OFFICE
CERTIFICATE OF CORRECTION

PATENT NO. : 5,087,969

DATED : February 11, 1992

INVENTOR(S) : Kamada et al.

It is certified that error appears in the above-identified patent and that said Letters Patent is hereby corrected as shown below:

| | | |
|---|---|---|
| Col. 2, | line 67, | "then clause" should be --then-clause--. |
| Col. 4, | line 40, | $\theta$ and $\rho 3$" should be --$\rho 2$ and $\theta 3$--; |
| | line 42, | "an" should be --$\Delta\rho$--; |
| | | "$\Delta\rho$" should be --$\Delta\theta$--; |
| | line 43, | "R($\theta 3,\rho 3$)" should be --R($\rho 3,\theta 3$)--; |
| | line 51, | "($\rho 3,\rho 3$) should be --($\rho 3,\theta 3$)--. |
| Col. 8, | line 13, | "linge" should be --line--. |
| Col. 10, | line 21, | "suing" should be --using--. |
| Col. 11, | line 26, | "52" should be --752--. |
| Col. 12, | line 16, | "'$\cos\theta$" should be --$\rho\cos\theta$--. |
| Col. 13, | line 16, | "E" should be the Greek symbol --$\Sigma$--. |
| Col. 15, | line 22, | "system" should be --method--. |

Signed and Sealed this

Twenty-eighth Day of September, 1993

Attest:

BRUCE LEHMAN

*Attesting Officer*    *Commissioner of Patents and Trademarks*